United States Patent
Takae et al.

(10) Patent No.: US 8,060,289 B2
(45) Date of Patent: Nov. 15, 2011

(54) VEHICLE DRIVING ASSIST SYSTEM

(75) Inventors: Yasuhiko Takae, Isehara (JP); Akira Onozuka, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 1219 days.

(21) Appl. No.: 11/748,048

(22) Filed: May 14, 2007

(65) Prior Publication Data

US 2007/0272464 A1 Nov. 29, 2007

(30) Foreign Application Priority Data

May 23, 2006 (JP) ................................. 2006-142711

(51) Int. Cl.
*B60T 7/16* (2006.01)
(52) U.S. Cl. .......................................... 701/96; 180/169
(58) Field of Classification Search .................... 703/96; 180/169; 701/96
See application file for complete search history.

(56) References Cited

U.S. PATENT DOCUMENTS

| | | | | |
|---|---|---|---|---|
| 4,809,177 | A * | 2/1989 | Windle et al. ...................... 701/1 |
| 6,052,632 | A * | 4/2000 | Iihoshi et al. .................... 701/36 |
| 6,067,020 | A * | 5/2000 | Wimmer ........................ 340/575 |
| 6,830,121 | B1 * | 12/2004 | Johnson ......................... 180/170 |
| 2002/0062189 | A1 * | 5/2002 | Kannonji ........................ 701/96 |
| 2002/0100628 | A1 * | 8/2002 | Jones ............................. 180/220 |
| 2003/0033073 | A1 * | 2/2003 | Kichima et al. ................ 701/96 |
| 2003/0163240 | A1 * | 8/2003 | Egami ............................ 701/96 |
| 2003/0233902 | A1 * | 12/2003 | Hijikata ........................... 74/513 |
| 2004/0172185 | A1 * | 9/2004 | Yamamura et al. ............. 701/96 |
| 2004/0225424 | A1 * | 11/2004 | Yamamura et al. ............. 701/36 |
| 2005/0043864 | A1 * | 2/2005 | Echtenkamp ...................... 701/1 |
| 2005/0065687 | A1 * | 3/2005 | Hijikata et al. ................. 701/41 |
| 2005/0110348 | A1 | 5/2005 | Hijikata et al. |
| 2005/0258977 | A1 * | 11/2005 | Kiefer et al. .................. 340/903 |
| 2006/0212207 | A1 * | 9/2006 | Sugano et al. .................. 701/93 |
| 2008/0255746 | A1 | 10/2008 | Hellmann et al. |
| 2009/0085791 | A1 * | 4/2009 | Ruby et al. ....................... 342/20 |

FOREIGN PATENT DOCUMENTS

DE 10 2004 022 266 A1 12/2005

(Continued)

OTHER PUBLICATIONS

The extended European Search Report of corresponding European Application No. 07108629.2-1523, dated May 29, 2009.

(Continued)

*Primary Examiner* — John Nguyen
*Assistant Examiner* — Kyung Kim
(74) *Attorney, Agent, or Firm* — Global IP Counselors, LLP

(57) ABSTRACT

A vehicle driving assist system is provided that calculates the risk potential of the host vehicle with respect to a preceding object existing in front of a host vehicle. A first driving assistance control system controls at least one of an actuation reaction force exerted by a driver-operated driving operation device and a braking/driving force exerted against the host vehicle based on the calculated risk potential. A second driving assistance control system configured to control the braking/driving force of the host vehicle such that at least one of a host vehicle speed and a headway distance between the host vehicle and the obstacle is maintained. An operating state reporting section reports an operating state of the first driving assistance control system based on an operating state of the second driving assistance control system, the risk potential, and an accelerator pedal actuation state.

27 Claims, 26 Drawing Sheets

FOREIGN PATENT DOCUMENTS

| | | |
|---|---|---|
| DE | 10 2004 051 909 A1 | 4/2006 |
| EP | 1 327 552 A2 | 7/2003 |
| EP | 1 749 724 A2 | 2/2007 |
| JP | 2001-088575 A | 4/2001 |
| JP | 2003-039978 A | 2/2003 |
| JP | 2003-320868 A | 11/2003 |
| JP | 2004-17847 | 1/2004 |
| JP | 2004-042890 A | 2/2004 |
| JP | 2004-118657 A | 4/2004 |
| JP | 2005-022647 A | 1/2005 |
| JP | 2005-096524 A | 4/2005 |
| JP | 2005-199875 A | 7/2005 |
| JP | 2006-007850 A | 1/2006 |

OTHER PUBLICATIONS

An English translation of the Japanese Office Action of correponding Japanese Application No. 2006-142711, dated Sep. 7, 2010.

* cited by examiner (a) SYSTEM A OPERATION-OFF AND SYSTEM B OPERATION-OFF (b) SYSTEM A OPERATION-ON AND SYSTEM B OPERATION-OFF (c) SYSTEM A OPERATION-OFF AND SYSTEM B OPERATION-ON (d) SYSTEM A OPERATION-ON AND SYSTEM B OPERATION-ON (a) RP CONVEYANCE CONTROL IN PROGRESS
(SPRING LENGTH: LONG)

(b) RP CONVEYANCE CONTROL IN PROGRESS
(SPRING LENGTH: MEDIUM)

(c) RP CONVEYANCE CONTROL IN PROGRESS
(SPRING LENGTH:SHORT)

(a) PRECEDING VEHICLE FOLLOWING CONTROL IN PROGRESS
(SET HEADWAY DISTANCE: LONG)

(b) PRECEDING VEHICLE FOLLOWING CONTROL IN PROGRESS
(SET HEADWAY DISTANCE: MEDIUM)

(c) PRECEDING VEHICLE FOLLOWING CONTROL IN PROGRESS
(SET HEADWAY DISTANCE: SHORT)

VEHICLE DRIVING ASSIST SYSTEM

CROSS-REFERENCE TO RELATED APPLICATIONS

This application claims priority to Japanese Patent Application No. 2006-142711, filed May 23, 2006. The entire disclosure of Japanese Patent Application No. 2006-142711 is hereby incorporated herein by reference.

BACKGROUND OF THE INVENTION

1. Field of the Invention

The present invention generally relates to a vehicle driving assist system configured to assist a driver with respect to the operation of a vehicle.

2. Background Information

Various vehicle driving assist systems has been proposed to assist a driver with respect to the operation of a vehicle. An example of a vehicle assist system is disclosed in Japanese Laid-Open Patent Application No. 2004-17847. In this publication, the vehicle driving assist system executes a headway or following distance control when the accelerator pedal of the vehicle is depressed within a prescribed range and to execute driving force control in accordance with the accelerator pedal actuation (depression) amount when the accelerator pedal is depressed by an amount lying outside the prescribed range. The system is also controls an actuation reaction force exerted by the accelerator pedal based on the degree of risk in the vicinity of the vehicle.

SUMMARY OF THE INVENTION

With conventional systems configured to execute following distance control and drive force control as described above, it is difficult for a driver to grasp the operating state of the system when the system switches between the two controls.

In accordance with one aspect of the present invention, a vehicle driving assist system is provided that basically comprises a preceding object detecting section, a risk potential calculating section, a first driving assistance control system, a second driving assistance control system, an accelerator pedal actuation state detecting section and an operating state reporting section. The preceding object detecting section is configured to detect a preceding object existing in front of a host vehicle. The risk potential calculating section is configured to calculate a risk potential indicative of a degree of convergence between the host vehicle and the preceding obstacle based on a detection result of the preceding object detecting section. The first driving assistance control system is configured to control at least one of an actuation reaction force exerted by a driver-operated driving operation device and a braking/driving force exerted against the host vehicle based on the risk potential calculated by the risk potential calculating section. The second driving assistance control system is configured to control the braking/driving force of the host vehicle such that at least one of a host vehicle speed and a headway distance between the host vehicle and the preceding obstacle is maintained. The accelerator pedal actuation state detecting section is configured to detect an actuation state of an accelerator pedal. The operating state reporting section is configured to report an operating state of the first driving assistance control system based on an operating state of the second driving assistance control system, the risk potential, and the accelerator pedal actuation state.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
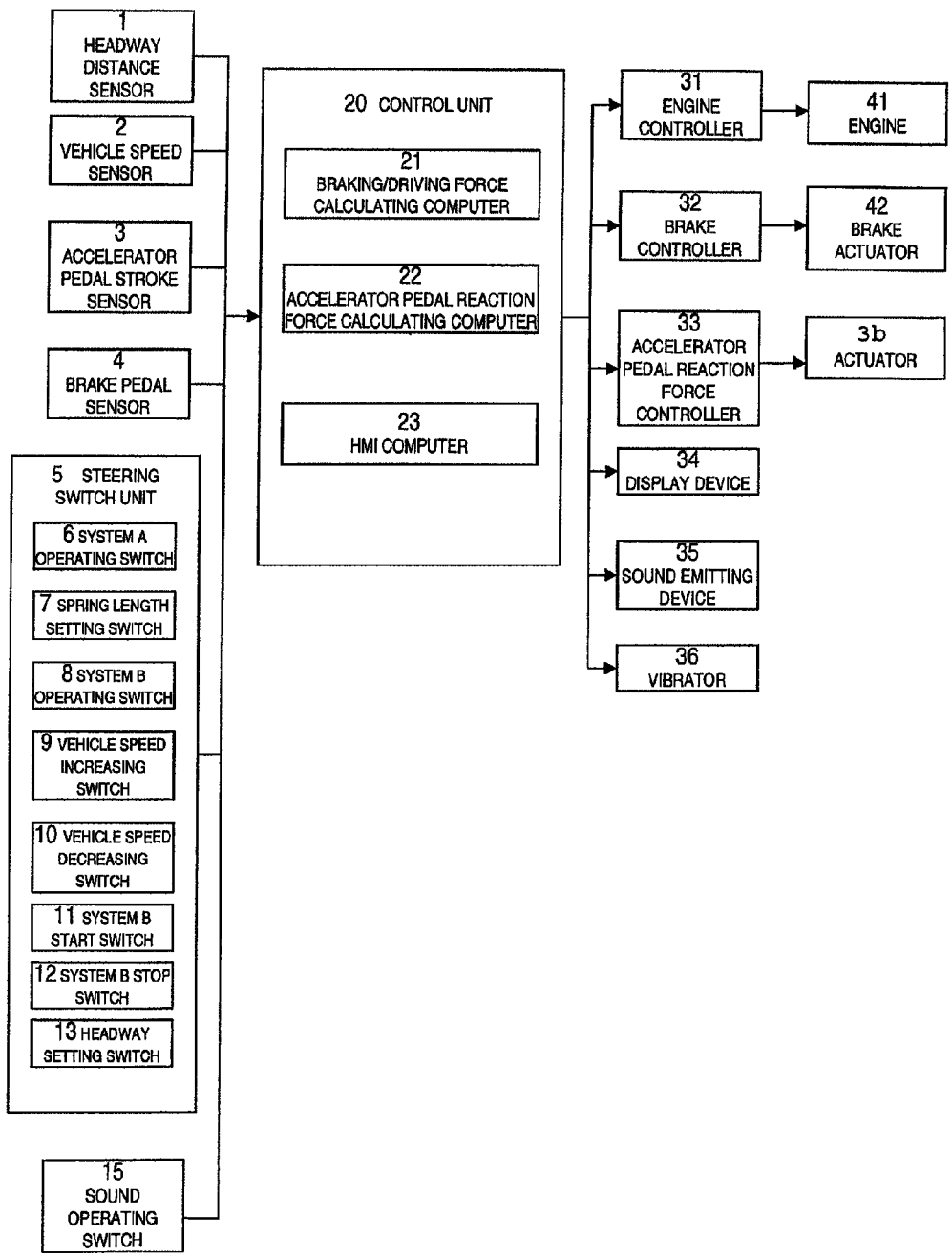
FIG. 1 is an exemplarily system diagram of a vehicle driving assist system in accordance with the present invention.
Figure 2:
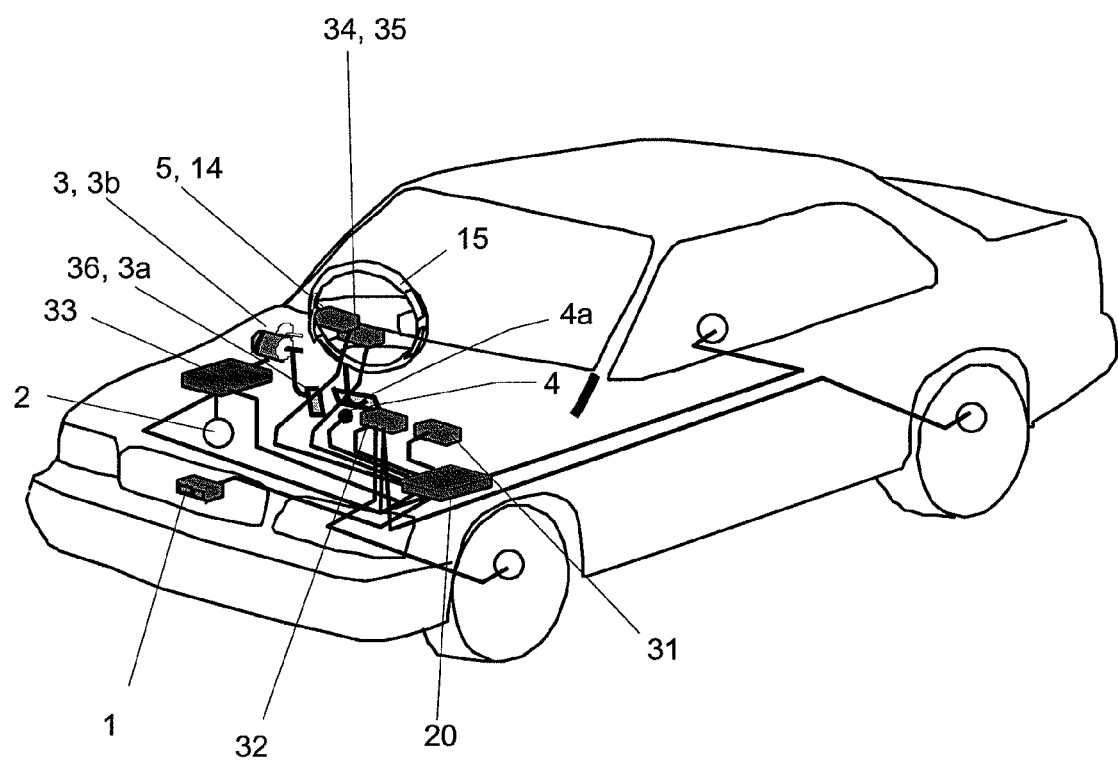
FIG. 2 is a schematic perspective view of a vehicle in which the vehicle driving assist system shown in FIG. 1 is installed in accordance with the present invention.

Referring initially to FIG. 1, an exemplarily system diagram of a vehicle driving assist system is illustrated in accordance with the present invention. FIG. 2 is a schematic perspective view of a vehicle (hereinafter also called "the host vehicle") in which the vehicle driving assist system shown in FIG. 1 is installed in accordance with the present invention. With the present invention, as explained below, the driver can be made aware of whether or not the vehicle driving assist system is executing a control based on the risk potential such that the driver can be urged toward a correct understanding of the operating state of the vehicle driving assist system in situations where the driver might otherwise misunderstand the operating state of the vehicle driving assist system.

The main structures and features of the vehicle driving assist system will now be explained. In order to detect the running conditions of the host vehicle, the vehicle driving assist system includes, among other things, a headway distance sensor 1, a vehicle speed sensor 2, an accelerator pedal stroke sensor 3 and a brake pedal sensor 4.

The headway distance sensor 1 is, for example, a laser radar device that is mounted to a front grill portion, a bumper portion, or the like of the host vehicle. The headway distance sensor 1 horizontally scans a region in front of the host vehicle with an infrared light pulse. The headway distance sensor 1 then measures the reflected light resulting from the infrared light reflecting off of a plurality of reflecting objects located in front of the host vehicle (normally, the rear ends of preceding vehicles). The region in front of the host vehicle scanned by the headway distance sensor 1 is, for example, ±6 degrees with respect to the front of the host vehicle and the system detects preceding objects existing within this angular range. By measuring the time required for the reflected light to arrive, the headway distance sensor 1 detects the headway or following distance with respect to the preceding vehicle(s) or other obstacle(s). In other words, the headway distance sensor 1 serves to determine if an obstacle, e.g., a preceding vehicle, exists in front of the host vehicle in which the system is installed and to measure the following distance between the host vehicle and the preceding vehicle when a preceding vehicle exists. The detect results of the headway distance sensor 1 are also used to calculate the relative velocity between the host vehicle and the preceding vehicle based on a derivative of the following distance.

Figure 3:
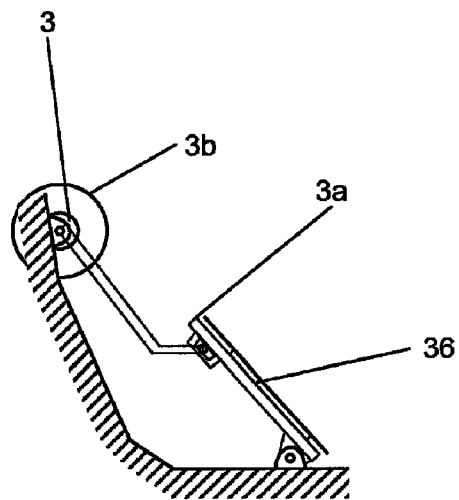
FIG. 3 is a schematic side elevational view of the vicinity of an accelerator pedal of the vehicle illustrated in FIG. 2.

The vehicle speed sensor 2 measures the traveling speed of the host vehicle based on the rotational speed of a wheel. The accelerator pedal stroke sensor 3 measures an actuation or depression amount of an accelerator pedal 3a to determine the driver's intentions with respect to acceleration. In other words, the accelerator pedal stroke sensor 3 is serves to detect if the driver is depressing the accelerator pedal 3a and to measure the depression amount (actuation amount) of the accelerator pedal 3a when it is being depressed. As shown in FIG. 3, the accelerator pedal stroke sensor 3 is installed into an actuator (e.g., a servomotor) 3b provided at the rotational center of the accelerator pedal 3a. The accelerator pedal stroke sensor 3 detects the actuation amount of the accelerator pedal 3a as a rotational angle of the servomotor 3b. The depression of the accelerator pedal 3a is converted into a rotational angle of the servomotor 3b by a linkage mechanism. The brake pedal sensor 4 measures an actuation or depression amount of a brake pedal 4a to determine the driver's intentions with respect to braking. The brake pedal sensor 4 serves to detect operation of a brake pedal by the driver.

Figure 4:
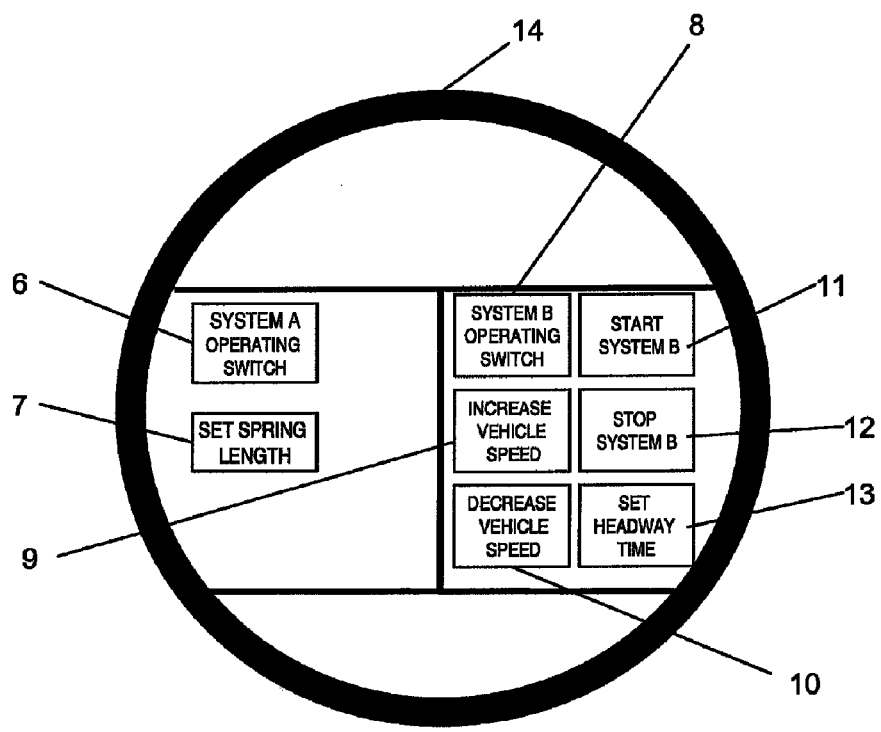
FIG. 4 is a simplified diagrammatic view of a steering wheel with a steering switch unit of the vehicle illustrated in FIG. 2.

Also the vehicle driving assist system is provided with a steering switch unit 5 in order for the driver to operate the vehicle driving assist system. The steering switch unit 5 includes a System A operating switch 6, a spring length setting switch 7, a System B operating switch 8, a vehicle speed increasing switch 9, a vehicle speed decreasing switch 10, a System B start switch 11, a System B stop switch 12, and a time to headway setting switch 13. These switches are provided, for example, as push buttons that are arranged on the steering wheel 14 in such a fashion as to be easy for the driver to operate. An example of the switch arrangement is shown in FIG. 4.

In addition, the vehicle driving assist system also includes, among other things, a sound operating switch 15, a control unit 20, an engine controller 31, a brake controller 32, an accelerator pedal reaction force controller 33, a display device 34, a sound emitting device 35 and a vibrator 36.

The control unit 20 comprises a CPU, a ROM, a RAM and other parts peripheral to the CPU. The control unit 20 controls the entire vehicle driving assist system based on input signals from the sensors and switches. More specifically, the control unit 20 calculates a risk potential regarding the vicinity of the host vehicle based on the following distance detected by the headway distance sensor 1 and the host vehicle speed detected by the vehicle speed sensor 2 and executes a risk potential conveyance control (hereinafter called "RP conveyance control") contrived to control the actuation reaction force exerted by the accelerator pedal 3a and the braking/driving force exerted against the host vehicle in accordance with the calculated risk potential.

The control unit 20 is also configured to execute a preceding vehicle following control that includes a vehicle speed control contrived to make the host vehicle travel at a constant preset speed (hereinafter called "set vehicle speed") when a preceding vehicle is not detected in the same lane as the host vehicle and a distance control configured to make the host vehicle follow a preceding vehicle while maintaining a substantially constant following distance with respect to the preceding vehicle when a preceding vehicle is detected in the same lane as the host vehicle. The distance control is contrived to impose the set vehicle speed as an upper limit on the host vehicle speed while the host vehicle is following the preceding vehicle.

The control unit 20 also includes a braking/driving force calculating computer 21, an accelerator pedal reaction force calculating computer 22 and an HMI computer 23. The braking/driving force calculating computer 21 calculates braking/driving force command values for use during the RP conveyance control and preceding vehicle following control. The accelerator pedal reaction force calculating computer 22 calculates an accelerator pedal actuation reaction force command value for use during the RP conveyance control. The HMI computer 23 send display command values to the display device 34, sound command values to the sound emitting device 35, and vibrator command values to the vibrator 36.

The engine controller 31 controls the engine 41 based on a driving force command value from the braking/driving force calculating computer 21. The engine controller 31 comprises, for example, a throttle actuator and serves to control the acceleration and deceleration of the host vehicle by controlling the opening degree of a throttle valve (not shown).

The brake controller 32 controls a brake actuator 42 based on a braking force command value from the braking/driving force calculating computer 21. The brake actuator 42 controls the braking forces exerted by hydraulic brakes provided on the wheels. The hydraulic brakes are configured to operate both in accordance with control exerted by the brake controller 32 and the brake actuator 42 and in accordance with operation of the brake pedal 4a by the driver.

The accelerator pedal reaction force controller 33 controls the actuation reaction force of the accelerator pedal 3a by controlling the servomotor 3b based on an accelerator pedal reaction force command value from the accelerator pedal reaction force calculating computer 22. The servomotor 3b controls the actuation reaction force generated when the driver operates the accelerator pedal 3a by controlling the torque and rotational angle based on a command value from the accelerator pedal reaction force controller 33. The normal reaction force characteristic exhibited by the accelerator pedal 3a when the accelerator pedal reaction force control is not executed is set such that, for example, the accelerator pedal reaction force increases linearly as the amount by which the accelerator pedal is depressed increases. The normal accelerator pedal reaction force characteristic can be realized by utilizing the spring force of a torsion spring (not shown) provided at the rotational center of the accelerator pedal 3a.

The display device 34 comprises, for example, a liquid crystal monitor provided in the gauge cluster. In accordance with commands from the HMI computer 23, the display device 34 displays indicator (image content) that indicates the states of the RP conveyance control and preceding vehicle following control executed by the vehicle driving assist system. The sound emitting device 35 is configured to report the states of the RP conveyance control and the preceding vehicle following control by outputting a voice message or an audible alarm in accordance with commands from the HMI computer 23. The vibrator 36 is a transducer or other vibrating device mounted on the pedal surface of the accelerator pedal 3a as shown in FIG. 3 that generates vibrations in accordance with a command from the HMI computer 23.

The braking/driving force calculating computer 21, the engine controller 31, the brake controller 32, and the accelerator pedal reaction force controller 33 cooperate together to constitute a System A that serves to execute the RP conveyance control. Similarly, the braking/driving force calculating computer 21, the engine controller 31, and the brake controller 32 cooperate together to constitute a System B that serves to execute the preceding vehicle following control.

The System A operating switch 6 turns System A "on" and "off", and thus, switches System A between an operation-ON state and an operation-OFF state. The vehicle driving assist system is configured such that System A is put into an operation-ON state when the ignition switch (not shown) is turned on. The spring length setting switch 7 sets the length of an imaginary spring (set spring length D_sysA) used for RP conveyance control when the system A is in the operation-ON state. The set spring length D_sysA can be set to any of three lengths: long, medium, and short. The set spring length D_sysA is automatically set to "long" when the ignition switch is turned on or when System A changes from the operation-OFF state to the operation-ON state.

The System B operating switch 8 turns System B "on" and "off", and thus, switches System B between an operation-ON state and an operation-OFF state. The vehicle driving assist system is configured such that System B is put into the operation-OFF state when the ignition switch is turned on. When the System B operating switch 8 is turned on, System B goes into a standby state. The vehicle speed increasing switch 9 increases the set vehicle speed used for preceding vehicle following control while System B is in the operation-ON state. The vehicle speed decreasing switch 10 decreases the set vehicle speed used for the preceding vehicle following control process while System B is in the operation-ON state.

The system B start switch 11 shifts System B from the standby state (achieved by turning on the System B operating switch 8) to an active or control state. When the System B start switch 11 is turned on, System B executes control in one of the following modes depending on the host vehicle speed and the existence or absence of a preceding vehicle: a vehicle speed control mode, a distance control mode, or a low speed following mode.

The System B stop switch 12 shifts System B from the vehicle speed control mode, the distance control mode, or the low speed following mode to the standby state. The time to headway setting switch 13 is used for changing a set time to headway used for traveling while following a preceding vehicle to any one of three lengths: long, medium, or short, when System B is in the operation-ON state. When System B is changed from the operation-OFF state to the operation-ON state, the set time to headway is set automatically to "long."

Figure 5:
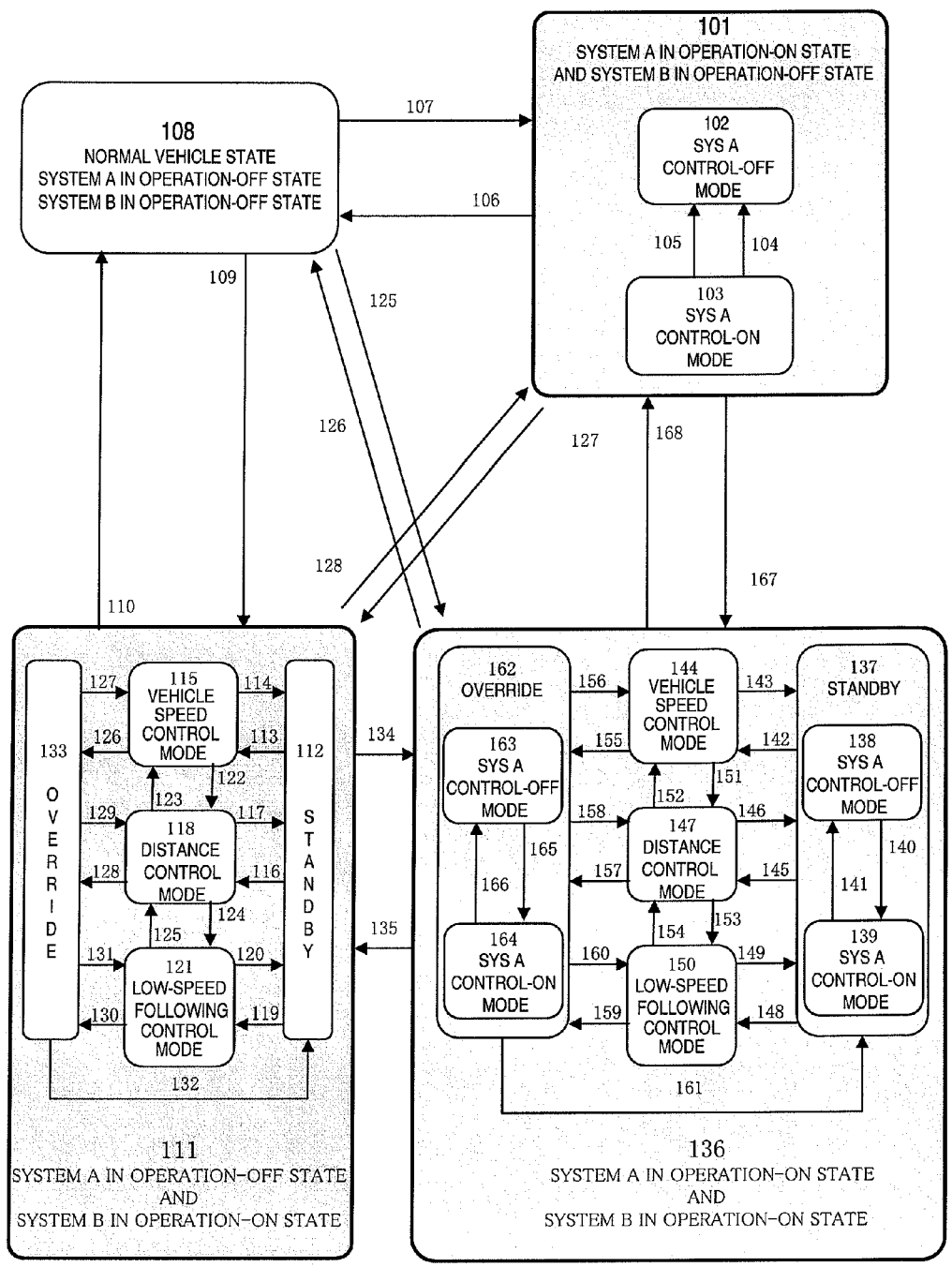
FIG. 5 is a simplified diagrammatic view of operation transition states of Systems A and B of the vehicle driving assist system.

The operational actions achieved with a vehicle driving assist system in accordance with the first embodiment of the present invention will now be explained. The RP conveyance control executed by System A and the preceding vehicle following control executed by System B are both turned on and off by the driver using operating switches provided on the steering switch unit 5. FIG. 5 illustrates the transitions of the operating states of Systems A and B.

The operation-ON state of System A is an active state in which it is possible to execute the RP conveyance control. Whether or not the RP conveyance control is actually executed while System A is in the operation-ON state is determined based on the risk potential RP and whether or not a preceding vehicle exists. The operation-ON state of System B is an active state in which it is possible to execute preceding vehicle following control. Whether or not preceding vehicle following control is actually executed is determined based on the vehicle speed of the host vehicle in which the driving assistance system is installed and the states of the System B start switch 11 and the System B stop switch 12. The operation-OFF state of System A is an inactive state in which the RP conveyance control cannot be executed and the operation OFF state of System B is an inactive in which preceding vehicle following control cannot be executed.

A state in which System A is in the operation-ON state and System B is in the operation-OFF state is called "the state 101." The vehicle driving assist system enters the state 101 when the ignition switch is turned on. In the state 101, the vehicle driving assist system is set to a System A control-OFF mode 102 or a System A control-ON mode 103. In the System A control-OFF mode 102, the RP conveyance control is not executed by System A. In System A control-ON mode 103, the accelerator pedal reaction force control and the braking/driving force control are executed as the RP conveyance control based on the calculated risk potential RP.

Figure 6:
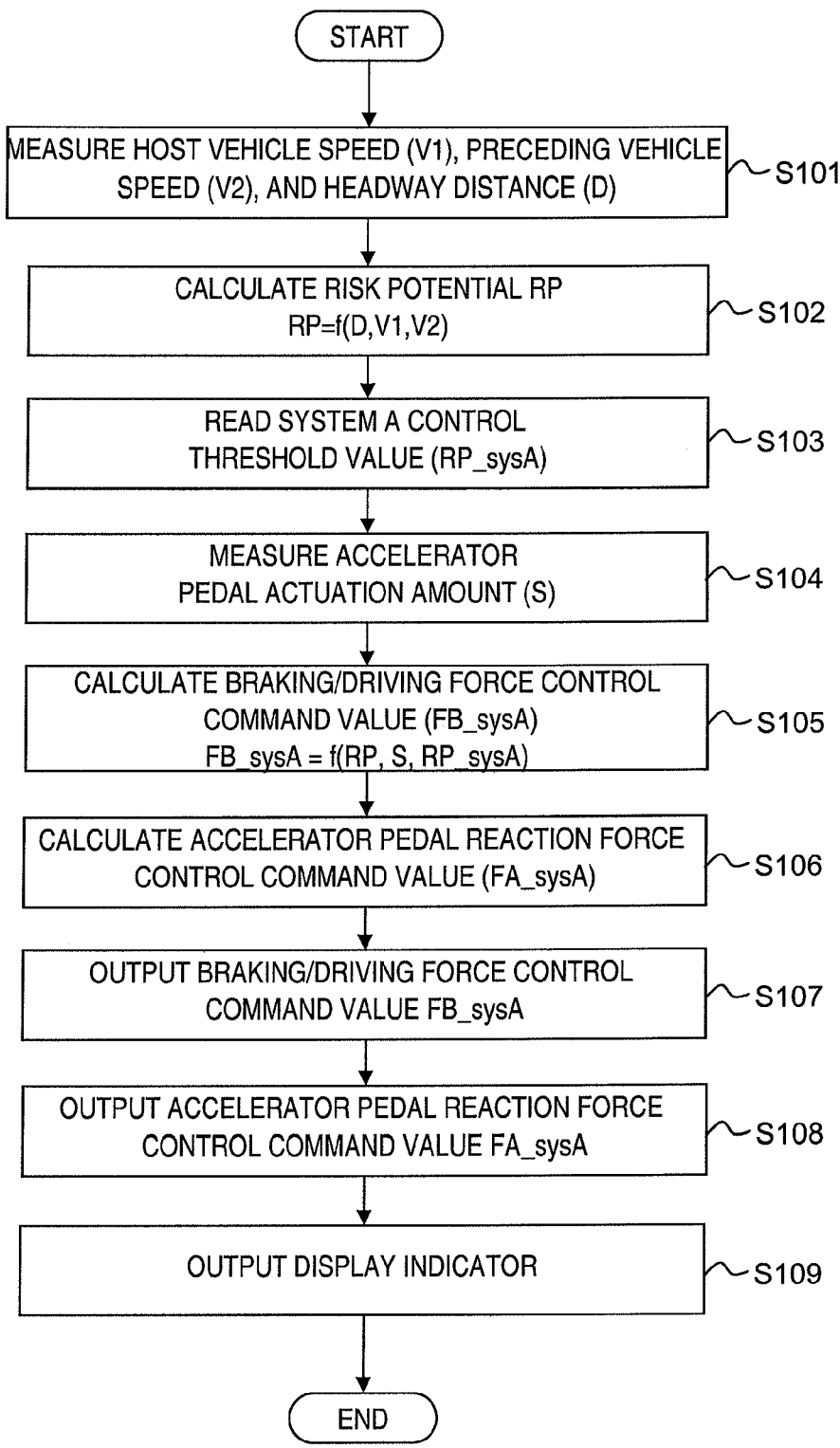
FIG. 6 is a flowchart showing the control processing steps executed in System A control mode by the vehicle driving assist system.

The processing executed when during the System A control-ON mode 103 will now be explained with reference to the flowchart of FIG. 6. FIG. 6 is a flowchart showing the driving assistance control program executed by the control unit 20. In particular, the flowchart shows the control processing steps executed during System A control-ON mode 103. This control loop is executed continuously once per prescribed time period, e.g., every 50 msec.

In step S101, the control unit 20 detects an obstacle existing in front of the host vehicle based on input signals from the headway distance sensor 1 and the vehicle speed sensor 2. The control unit 20 also detects the host vehicle speed V1, the relative velocity Vr, and the headway distance D. Here, it is assumed, for example, that the preceding obstacle is a preceding vehicle. The traveling speed V2 of the preceding vehicle is calculated based on the host vehicle speed V1 and the relative velocity Vr (i.e., Vr=V1−V2).

In step S102, the risk potential RP of the host vehicle with respect to the preceding object is calculated based on the vehicle running condition and traveling environment (traveling situation) of the vehicle detected in step S101. The term "risk potential RP" refers to the degree of risk or possibility of danger. In this embodiment, the risk potential is contrived to increase as the vehicle and a preceding obstacle approach each other. Thus, it can be that the risk potential RP is a physical quantity that expresses how close the vehicle and the preceding obstacle are relative to each other, i.e., the degree to which the vehicle and the preceding obstacle have drawn near to each other (degree of convergence).

In order to calculate the risk potential RP, the control unit 20 calculates the time to headway THW and the time to collision TTC between the vehicle and the preceding obstacle. The time to headway THW is a physical quantity indicating the time required for the vehicle to reach the current position of the preceding object, e.g., preceding vehicle, and is calculated using Equation 1 below based on the host vehicle speed V1 and the headway distance D.

$$THW = D/V1 \quad \text{(Equation 1)}$$

The time to collision TTC is a physical quantity indicating the current degree of convergence of the vehicle with respect to the preceding vehicle. More specifically, the time to collision TTC is a value indicating the number of seconds until the headway distance D becomes zero and the vehicle contacts the preceding vehicle if the current vehicle running condition continues, i.e., if the host vehicle speed V1 and the relative velocity Vr remain constant. The relative velocity Vr (i.e., Vr=V1−V2) is treated as zero (0) when the traveling speed of the preceding vehicle is larger than the traveling speed of the vehicle. The time to collision TTC with respect to the preceding obstacle is found using the Equation 2 shown below.

$$TTC = D/Vr \quad \text{(Equation 2)}$$

The smaller the time to collision TTC is, the more eminent the contact with the preceding vehicle is and the larger the degree of convergence with respect to the preceding vehicle is. For example, it is known that when approaching a preceding vehicle, most drivers start taking action to decelerate before the time to collision TTC reaches 4 seconds or less.

The risk potential RP is calculated with Equation 3 below based on the time to collision TTC and time to headway THW.

$$RP = a/THW + b/TTC \quad \text{(Equation 3)}$$

As shown in Equation 3, the risk potential is a physical quantity expressed in a continuous manner as a sum involving the time to collision TTC and the time to headway THW. The quantities "a" and "b" are parameters for appropriately weighting the time to headway THW and the time to collision TTC that are for example set to approximately a=1 and b=1.

In step S103, the control unit 20 reads a control threshold value RP_sysA for System A. The System A control threshold value RP_sysA is determined based on the set spring length D_sysA, which is set by operating the spring length setting switch 7. When the set spring length D_sysA is L (long), the threshold value RP_sysA is set to 0.7. When the set spring length D_sysA is M (medium), the threshold value RP_sysA is set to 1.5. When the set spring length D_sysA is S (short), the threshold value RP_sysA is set to 2. In step S104, the control unit 20 reads in the accelerator pedal actuation amount S detected by the accelerator pedal stroke sensor 3.

In step S105, the control unit 20 calculates a braking/driving force control command value FB_sysA based on the risk potential RP calculated in step S1102, the System A control threshold value RP_sysA read in step S103, and the accelerator pedal actuation amount S read in step S104. When the risk potential RP is equal to or larger than the System A threshold value RP_sysA, the control unit 20 uses the map shown in FIG. 7 and the risk potential RP to calculate the repelling force Fc of an imaginary spring set on the front of the vehicle.

The repelling force Fc corresponds to the repelling force of an imaginary spring that is mounted to the front of the vehicle and becomes compressed by contacting a preceding vehicle, thus generating an artificial traveling resistance against the vehicle. The more the risk potential RP increases beyond a prescribed value RPmin, the more the imaginary spring becomes compressed and the larger the repelling force Fc becomes. The braking/driving force control command value FB_sysA is calculated by subtracting the repelling force Fc calculated based on the risk potential RP from a driver requested driving force corresponding to the accelerator pedal actuation amount S.

In step S106, the control unit 20 calculates an accelerator pedal reaction force control command value FA_sysA based on the risk potential RP, the System A control threshold value RP_sysA, and the accelerator pedal actuation amount S. FIG.

8 is a graph plotting the reaction force control command value FA_sysA versus the risk potential RP. The reaction force control command value FA_sysA is set such that it increases gradually as the risk potential RP increases beyond a prescribed value RPmin.

In step S107, the control unit 20 outputs the braking/driving force control command value FB_sysA calculated in step S105 to the engine controller 31 and the brake controller 32. The engine controller 31 controls the engine 41 such that the braking/driving force control command value FB_sysA outputted from the control unit 20 is realized. When the braking/driving force control command value FB_sysA cannot be achieved with driving force control by the engine controller 31 alone, the brake controller 32 executes braking force control by controlling the brake actuator 42. Thus, the term "braking/driving force" as used herein refers to either a driving force alone, a braking force alone, or a combination of both a driving force and a braking force.

In step S108, the control unit 20 sends the accelerator pedal reaction force control command value FA_sysA calculated in step S106 to the accelerator pedal reaction force controller 33. The accelerator pedal reaction force controller 33 controls the actuation reaction force exerted by the accelerator pedal 3*a* based on the command value FA_sysA received from the control unit 20. More specifically, the accelerator pedal 3*a* is made to exert an actuation reaction force equal to the sum of the reaction force control command value FA_sysA and a value obtained with a normal accelerator pedal reaction force characteristic set to be substantially proportional to the accelerator pedal actuation amount S.

Figure 9:
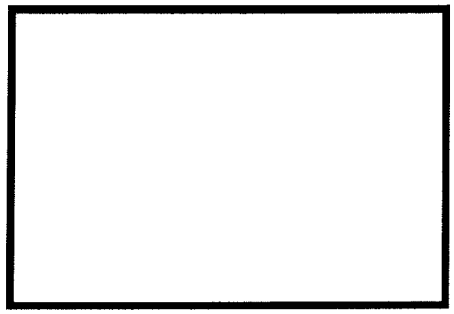
FIG. 9 is a series of diagrams (a) to (d) showing examples of what is displayed during different operating states of Systems A and B in accordance with the vehicle driving assist system of the present invention.
Figure 9:
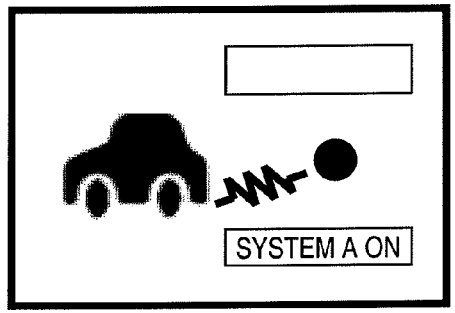
Figure 9:
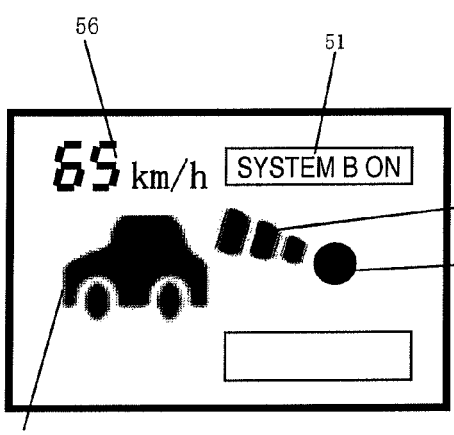
Figure 9:
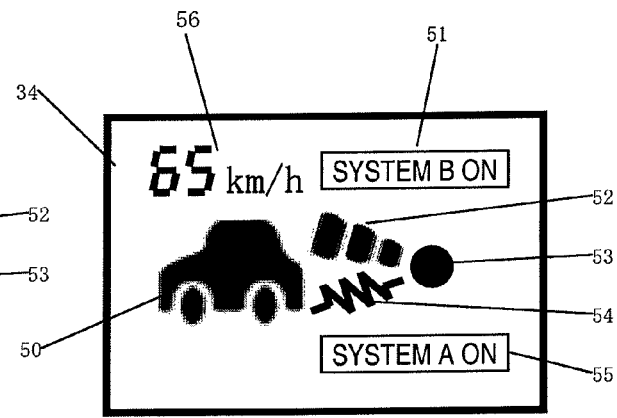

In step S109, the control unit 20 sends a signal to the display device 34 instructing the display device 34 to display an indicator indicating that System A is in the operation-ON state in the System A control-ON mode 103 and the RP conveyance control is in progress. FIG. 9 illustrates a series of diagrams (a) to (d) showing examples of what is displayed during each combination of the operation-ON state and the operation-OFF state of Systems A and B. Diagram (b) of FIG. 9 shows an example of the indicator displayed on the display monitor during a state 101 (System A operation-ON and System B operation-OFF). Diagram (a) of FIG. 9 shows an example of the indicator displayed during a state 108 (System A operation-OFF and System B operation-OFF). Diagram (c) of FIG. 9 shows an example of the indicator displayed during a state 111 (System A operation-OFF and System B operation-ON). Diagram (d) of FIG. 9 shows an example of the indicator displayed during a state 136 (System A operation-ON and System B operation ON).

When the headway distance sensor 1 detects a preceding vehicle in front of the vehicle, a preceding vehicle image or mark 50 is displayed to indicate that a preceding vehicle has been captured by the system. When System B is in the operation-ON state, "System B ON" is displayed with text in a region 51. When System B is in the operation-OFF state, nothing is displayed in the region 51. When System B is in the operation-ON state, a headway distance setting mark 52 corresponding to the set following distance is displayed.

A vehicle image or mark 53 indicting the host vehicle in which the driving assistance system is installed is displayed whenever at least one of Systems A and B is in the operation-ON state. When System A is in the operation-ON state, a spring length image or mark 54 corresponding to the set spring length is displayed and "System A ON" is displayed in text in a region 55. When System A is in the operation-OFF state, nothing is displayed in the region 55. When System B is in the operation-ON state, the set vehicle speed is displayed in a region 56.

Figure 10:
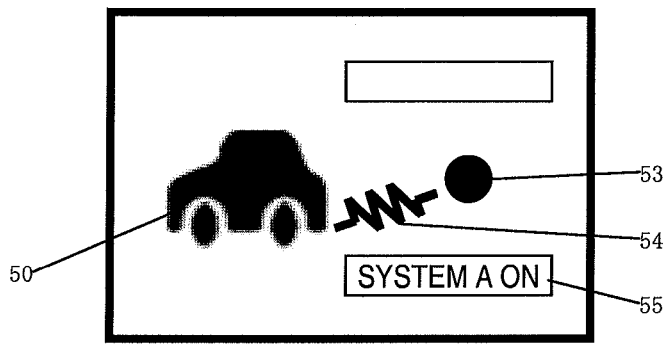
FIG. 10 is a series of diagrams (a) to (c) showing examples of what is displayed during the RP conveyance control in accordance with the vehicle driving assist system of the present invention.
Figure 10:
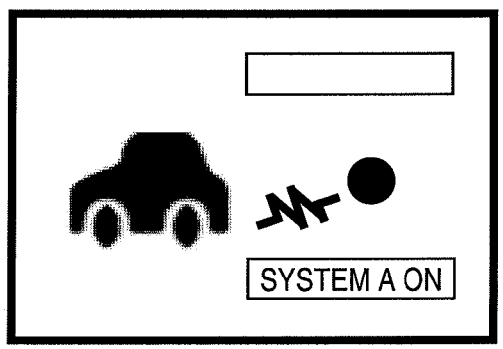
Figure 10:
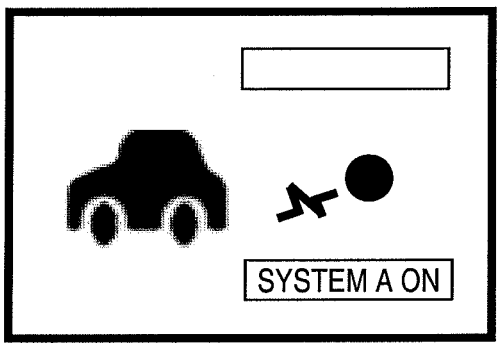

In this way, various display elements indicting the operating states of Systems A and B can be displayed on the display monitor of the display device 34. In System A control-ON mode 103, the preceding vehicle image or mark 50, the vehicle image or mark 53, the spring length image or mark 54, and "System A ON" (region 55) are displayed as shown in diagrams (a) to (c) of FIG. 10. As illustrated in diagrams (a) to (c) of FIG. 10, the spring length image or mark 54 is configured to indicate the set spring length D_sysA, either long, medium, or short. After the control unit 20 sends the signal to the display device 34, the current cycle of control processing in accordance with the System A control-ON mode 103 ends.

When the driving assistance system is in the System A control-OFF mode 102, it shifts to the System A control-ON mode 103 (i.e., executes mode shift 104) if a preceding vehicle is detected by the headway distance sensor 1 and the risk potential RP with respect to the detected preceding vehicle is equal to or larger than the System A control threshold value RP_sysA. Meanwhile, when the driving assistance system is in the System A control-ON mode 103, it shifts to the System A control-OFF mode 102 (i.e., executes mode shift 105) if the preceding vehicle ceases to be detected by the headway distance sensor 1 or if the risk potential RP with respect to the detected preceding becomes smaller than the System A control threshold value RP_sysA.

When the driving assistance system is in the state 101 and the System A operating switch 6 is pressed, the driving assistance system shifts to a state 108 in which Systems A and B are both in the operation-OFF state (state shift 106). When the driving assistance system is in the state 108 and the System A operating switch 6 is pressed, the driving assistance system shifts to the state 101 (state shift 107). When System A shifts from the operation-OFF state to the operation-ON state, the sound emitting device 35 issues voice message stating that System A has entered the operation-ON state. When System A shifts from the operation-ON state to the operation-OFF state, the sound emitting device 35 issues voice message stating that System A has entered the operation-OFF state. In the state 108, neither System A nor System B operates and the vehicle operates in the same manner as a normal vehicle that is not equipped with such systems.

When the driving assistance system is in the state 108 and the System B operating switch 8 is pressed, the driving assistance system shifts to a state 111 in which System A is in the operation-OFF state and System B is in the operation-ON state (state shift 109). When the driving assistance system is in the state 111 and the System B operating switch 8 is pressed, the driving assistance system shifts to the state 108 (state shift 110). When System B shifts from the operation-OFF state to the operation-ON state, the sound emitting device 35 issues voice message stating that System B has entered the operation-ON state. When System B shifts from the operation-ON state to the operation-OFF state, the sound emitting device 35 issues voice message stating that System B has entered the operation-OFF state.

In the state 111, System A does not operate and only System B can operate. In the standby state 112, the operation of System B is put into a standby state and preceding vehicle following control is not executed. The driving assistance system shifts to a vehicle speed control mode 115 (mode shift 113) when the System B start switch 11 is pressed while the driving assistance system is in the standby state 112, a preceding vehicle is not detected by the headway distance sensor 1, and the vehicle is traveling at 40 km/h or faster. Meanwhile, the driving assistance system shifts to the standby state 112 (mode shift 114) when the System B stop switch 12 is pressed or a brake actuation (operation) by the driver is detected by the brake pedal sensor 4 while the driving assistance system is in the vehicle speed control mode 115.

Figure 11:
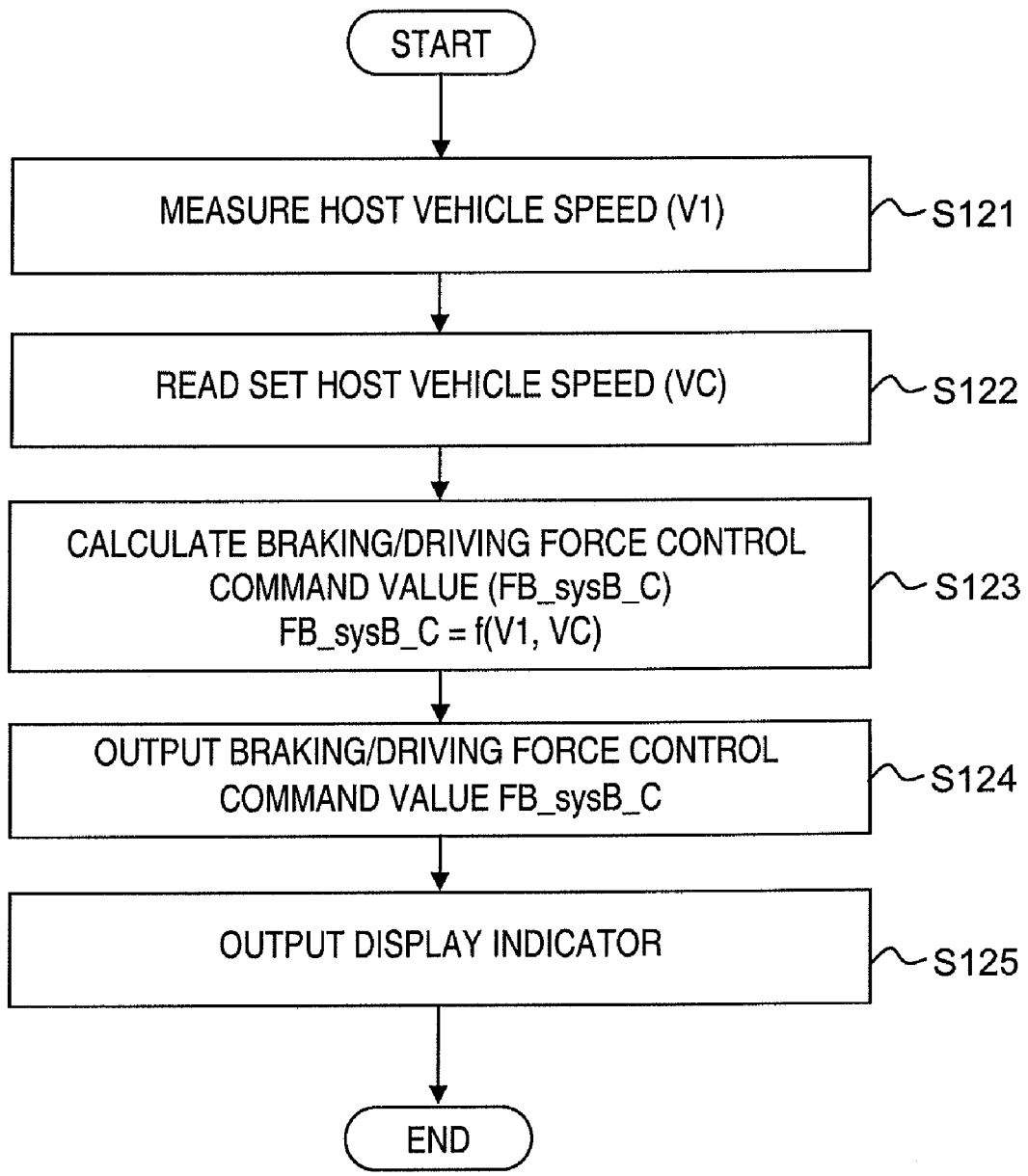
FIG. 11 is a flowchart showing the control processing steps executed in vehicle speed control mode in accordance with the vehicle driving assist system of the present invention.

In the vehicle speed control mode 115, the driving assistance system executes braking/driving force control such that the vehicle maintains a set vehicle speed VC. The control processing executed in order to maintain the set vehicle speed VC will now be explained with reference to the flowchart of FIG. 11. FIG. 11 is a flowchart showing a driving assistance control program executed by the control unit 20. In particular, the flowchart shows the processing steps of the preceding vehicle following control program executed by System B in order to accomplish the vehicle speed control mode 115. This control loop is executed continuously once per prescribed time period, e.g., every 50 msec.

In step S121, the control unit 20 detects the vehicle running condition of the vehicle. More specifically, the control unit 20 reads the host vehicle speed V1 detected by the vehicle speed sensor 2. In step S122, the control unit 20 reads the set vehicle speed VC to be used in vehicle speed control mode 115. The host vehicle speed V1 detected when the driving assistance system shifted from the standby state 112 to the vehicle speed control mode 115 is set as the initial value of the vehicle speed VC. The set vehicle speed VC can be changed in 5 km/h intervals by operating the vehicle speed increasing switch 9 and the vehicle speed decreasing switch 10.

In step S123, the control unit 20 calculates a braking/driving force control command value FB_sysB_C for traveling while maintaining the set vehicle speed VC based on the host vehicle speed V1 detected in step S121 and the set vehicle speed VC read in step S122. The value FB_sysB_C can be calculated using any of various methods. In step S124, the control unit 20 sends the braking/driving force control command value FB_sysB_C calculated in step S123 to the engine controller 31 and the brake controller 32. The engine controller 31 controls the engine 41 and the brake controller 32 controls the brake actuator 42 in such a fashion that the braking/driving force of the vehicle is controlled to such a value that the traveling speed of the vehicle is maintained at the set vehicle speed VC.

Figure 12:
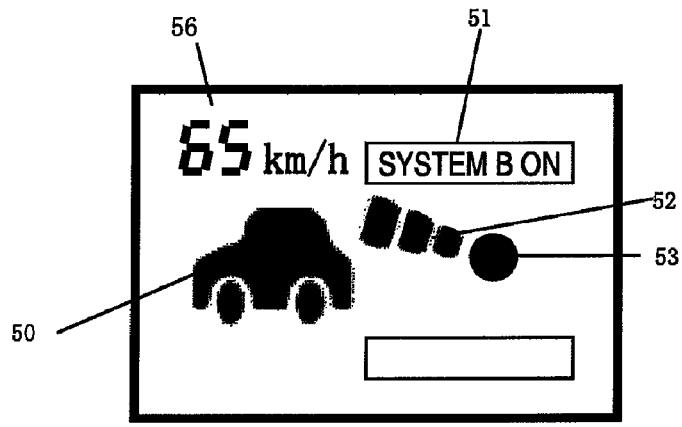
FIG. 12 is a series of diagrams (a) to (c) showing examples of what is displayed during preceding vehicle following control in accordance with the vehicle driving assist system of the present invention.
Figure 12:
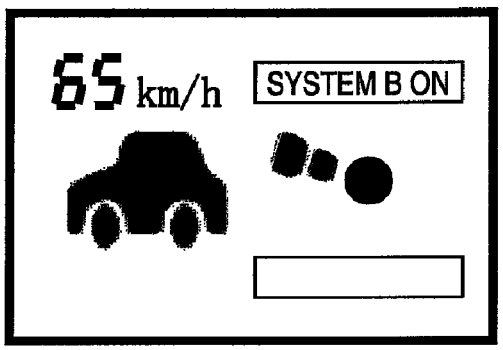
Figure 12:
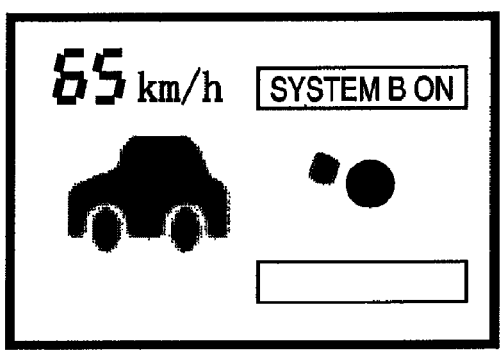

In step S125, the control unit 20 sends a signal to the display device 34 instructing the display device 34 to display an indicator indicating that System B is in the operation-ON state and that preceding vehicle following control is in progress. FIG. 12 illustrates a series of diagrams (a) to (c) showing examples of what is displayed when System B is in the operation-ON state. As illustrated in the diagrams (a) to (c) of FIG. 12, in the vehicle speed control mode 115 the preceding vehicle mark 50, "System B ON" (region 51), the headway distance setting mark 52, the vehicle mark 53, and the set vehicle speed VC (region 56). FIG. 12 illustrates an example in which the set vehicle speed VC is 65 km/h. As illustrated in the diagrams (a) to (c) of FIG. 12, the headway distance setting mark 52 is configured to indicate the set following distance as either long, medium, or short (described later), respectively. It is also possible to turn off the headway distance setting mark 52 during the vehicle speed control mode 115. After the signal is sent, the current cycle of control processing in accordance with the vehicle speed control mode 115 ends.

The driving assistance system shifts to a distance control mode 118 (mode shift 116) when the System B start switch 11 is pressed while the driving assistance system is in the standby state 112, a preceding vehicle is detected by the headway distance sensor 1, and the vehicle is traveling at 40 km/h or faster. Meanwhile, the driving assistance system shifts to the standby state 112 (mode shift 117) when the System B stop switch 12 is pressed or a brake actuation (operation) by the driver is detected by the brake pedal sensor 4 while the driving assistance system is in the distance control mode 118.

Figure 13:
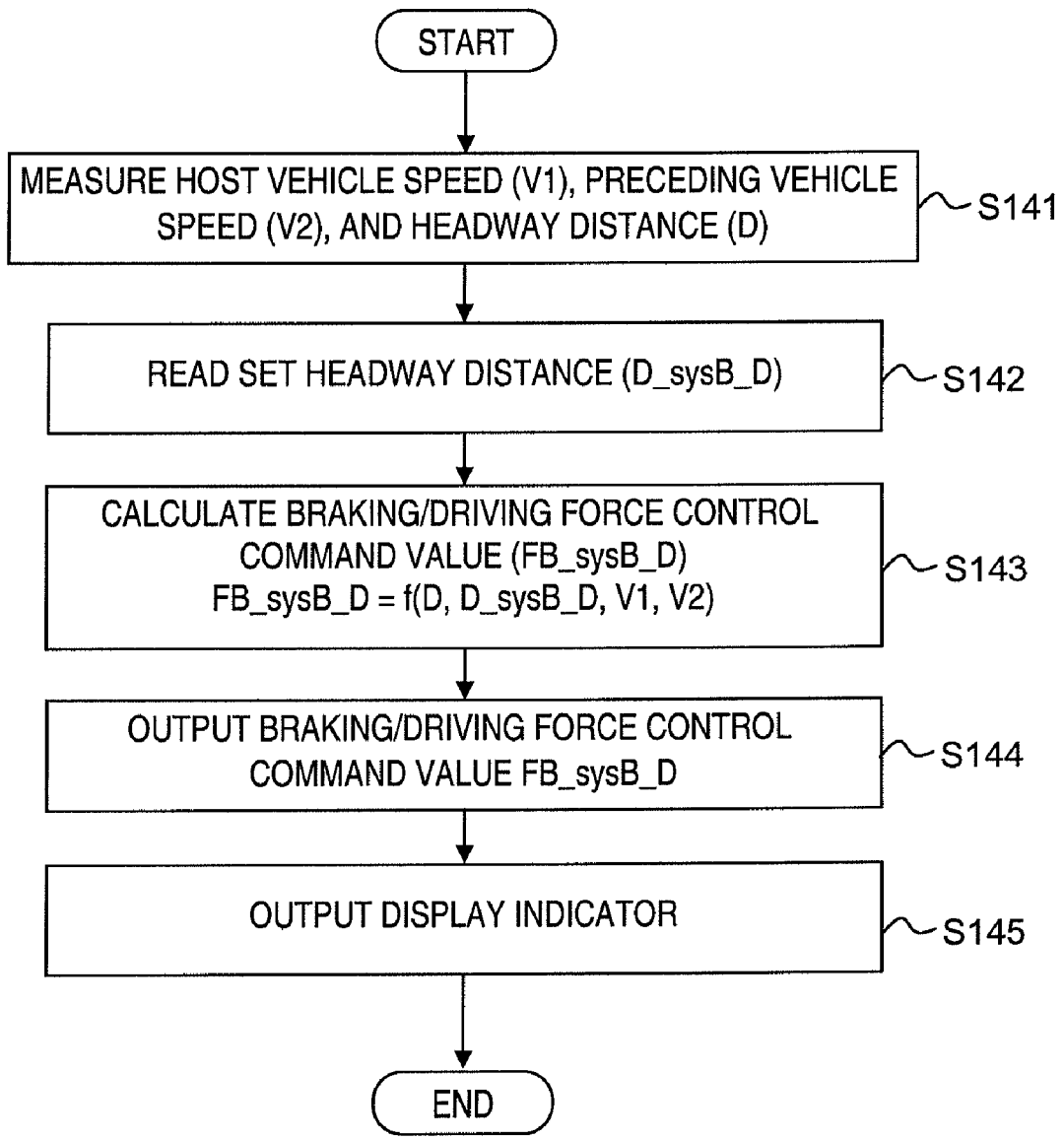
FIG. 13 is a flowchart showing the control processing steps executed in vehicle speed control mode in accordance with the vehicle driving assist system of the present invention

In the distance control mode 118, the control unit 20 executes braking/driving force control such that the host vehicle follows the preceding vehicle while maintaining a set headway distance D_sysB_D when the vehicle speed is 40 km/h or higher. The control processing executed in order to maintain the set headway distance D_sysB_D will now be explained with reference to the flowchart of FIG. 13. FIG. 13 is a flowchart showing a driving assistance control program executed by the control unit 20. In particular, the flowchart shows the processing steps of the preceding vehicle following control program executed by System B in order to accomplish the distance control mode 118. This control loop is executed continuously once per prescribed time period, e.g., every 50 msec.

In step S141, the control unit 20 reads in the host vehicle speed V1, the preceding vehicle speed V2, and the headway distance D based on the detection signals from the headway distance sensor 1 and the vehicle speed sensor 2. In step S142, the control unit 20 reads the set headway distance D_sysB_D to be used in distance control mode 118. The set headway distance D_sysB_D is set in accordance with the set time to headway THW, which is set to L (long), medium (M), or short (S) by operating the time to headway setting switch 13. When the time to headway THW is set to L (long), the set headway distance D_sysB_D is set to a distance value corresponding to a time to headway THW of 3 seconds. When the time to headway THW is set to M (medium), the set headway distance D_sysB_D is set to a distance value corresponding to a time to headway THW of 2 seconds. When the time to headway THW is set to S (short), the set headway distance D_sysB_D is set to a distance value corresponding to a time to headway THW of 1.5 seconds.

In step S143, the control unit 20 calculates a braking/driving force control command value FB_sysB_D for making the host vehicle follow the preceding vehicle while maintaining the set headway distance D_sysB_D. The calculation is based on the host vehicle speed V1, the preceding vehicle speed V2, and the headway distance D detected in step S141 and the set headway distance D_sysB_D read in step S142. The value FB_sysB_D can be calculated using any of various methods. In step S144, the control unit 20 sends the braking/driving force control command value FB_sysB_D calculated in step S143 to the engine controller 31 and the brake controller 32. As a result, the braking/driving force of the vehicle is controlled such that the vehicle follows the preceding vehicle while maintaining the set following distance FB_sysB_D.

In step S145, the control unit 20 sends a signal to the display device 34 instructing the display device 34 to display indicator indicating that System B is in the operation-ON state and that preceding vehicle following control in accordance with the distance control mode 118 is in progress. The indicator shown in each of the diagrams (a) to (c) of FIG. 12 that is displayed depends on the set headway distance D_sysB_D. After the signal is sent, the current cycle of control processing in accordance with the distance control mode 118 ends.

The driving assistance system shifts to a low-speed following control mode 121 (mode shift 119) when the System B start switch 11 is pressed while the driving assistance system is in the standby state 112, a preceding vehicle is detected by the headway distance sensor 1, and the vehicle is traveling at a speed below 40 km/h. The driving assistance system shifts from the low-speed following control mode 121 to the standby state 112 (mode shift 120) when the System B stop switch 12 is pressed, brake operation by the driver is detected by the brake pedal sensor 4, the preceding vehicle detected by the headway distance sensor 1 ceases to be detected, or the vehicle speed decreases to 10 km/h or lower while the driving assistance system is in the low-speed following control mode 121.

Figure 14:
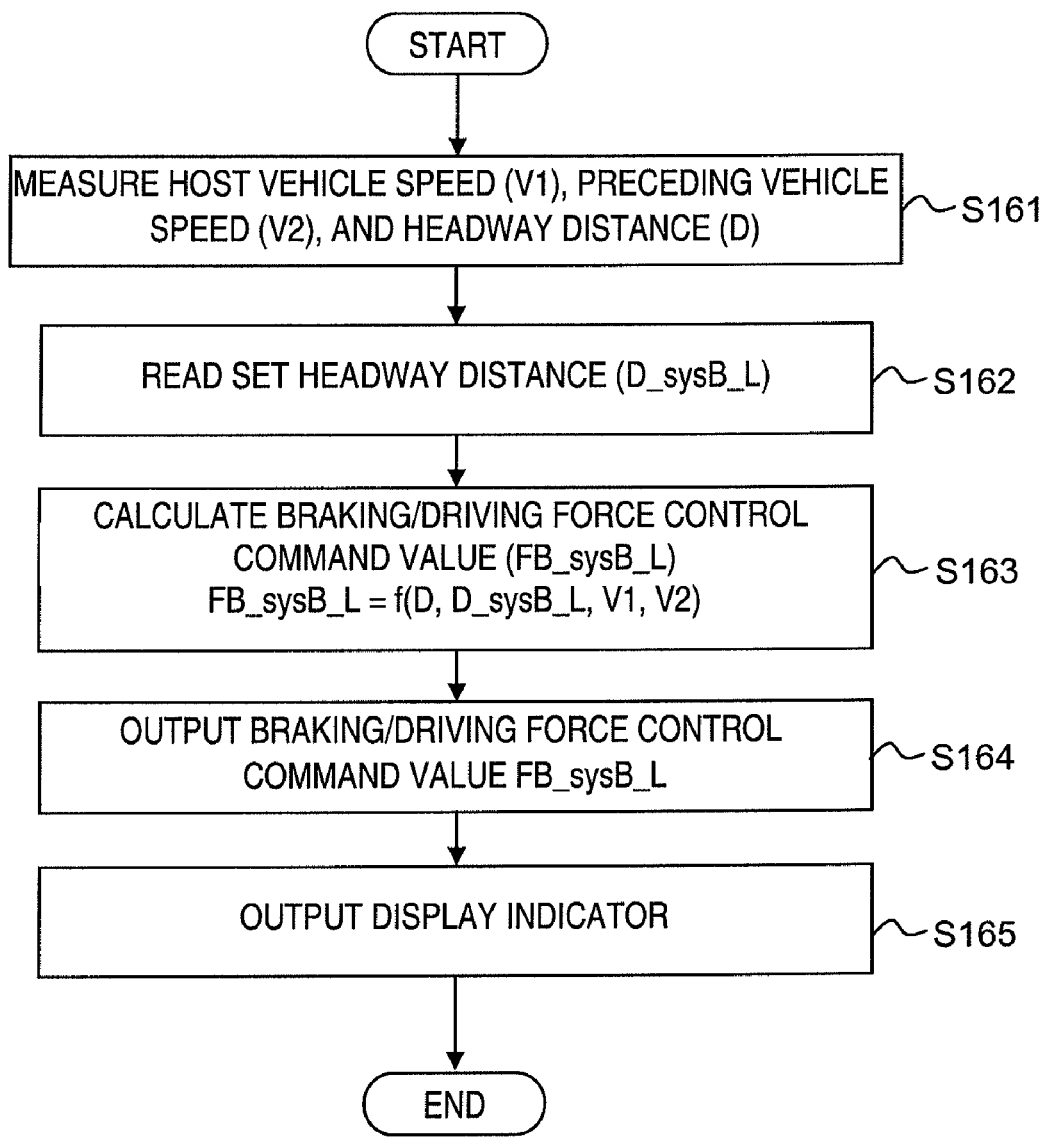
FIG. 14 is a flowchart showing the control processing steps executed in low-speed following control mode in accordance with the vehicle driving assist system of the present invention.

In the low-speed following control mode 121, the control unit 20 executes braking/driving force control such that the vehicle follows the preceding vehicle while maintaining a set headway distance D_sysB_L when the vehicle speed is below 40 km/h. The control processing executed in order to maintain the set headway distance D_sysB_L will now be explained with reference to the flowchart of FIG. 14. FIG. 14 is a flowchart showing a driving assistance control program executed by the control unit 20. In particular, the flowchart shows the processing steps of the preceding vehicle following control program executed by System B in order to accomplish the low-speed following control mode 121. This control loop is executed continuously once per prescribed time period, e.g., every 50 msec.

In step S161, the control unit 20 reads in the host vehicle speed V1, the preceding vehicle speed V2, and the headway distance D based on the detection signals from the headway distance sensor 1 and the vehicle speed sensor 2. In step S162, the control unit 20 reads the set headway distance D_sysB_L to be used in low-speed following control mode 121. The set headway distance D_sysB_L is set in accordance with the set time to headway THW, which is set to L (long), medium (M), or short (S) by operating the time to headway setting switch 13. When the time to headway THW is set to L (long), the set headway distance D_sysB_L is set to a distance value corresponding to a time to headway THW of 5 seconds. When the time to headway THW is set to M (medium), the set headway distance D_sysB_L is set to a distance value corresponding to a time to headway THW of 4 seconds. When the time to headway THW is set to S (short), the set headway distance D_sysB_L is set to a distance value corresponding to a time to headway THW of 3 seconds.

In step S163, the control unit 20 calculates a braking/driving force control command value FB_sysB_L for making the host vehicle follow the preceding vehicle while maintaining the set headway distance D_sysB_L. The calculation is based on the host vehicle speed V1, the preceding vehicle speed V2, and the headway distance D detected in step S161 and the set headway distance D_sysB_L read in step S162. The value FB_sysB_L can be calculated using any of various methods. In step S164, the control unit 20 sends the braking/driving force control command value FB_sysB_L calculated in step S163 to the engine controller 31 and the brake controller 32. As a result, the braking/driving force of the host vehicle is controlled such that the host vehicle follows the preceding vehicle while maintaining the set following distance FB_sysB_L.

In step S165, the control unit 20 sends a signal to the display device 34 instructing the display device 34 to display an indicator indicating that System B is in the operation-ON state and that preceding vehicle following control in accordance with the low-speed following control mode 121 is in progress. The indicator shown in each of the diagrams (a) to (c) of FIG. 12 that is displayed depends on the set headway distance D_sysB_L. In the low-speed following control mode 121, the display of the set vehicle speed in the region 56 can be turned off. After the signal is sent, the current cycle of control processing in accordance with the following distance control mode 121 ends.

If the headway distance sensor 1 detects a preceding vehicle while the driving assistance system is in the vehicle speed control mode 115, then the driving assistance system shifts to the distance control mode 118 (mode shift 122). If the headway distance sensor 1 stops detecting the preceding vehicle while the driving assistance system is in the distance control mode 118, then the driving assistance system shifts to the vehicle speed control mode 115 (mode shift 123). If the vehicle speed decreases to below 40 km/h while the driving assistance system is in the distance control mode 118, then the driving assistance system shifts to the low-speed following control mode 121 (mode shift 124).

When the driving assistance system is in the low-speed following control mode 121, it shifts to the distance control mode 118 (mode shift 125) if the vehicle speed increases to 40 km/h or higher and a set vehicle speed VC for the vehicle speed control mode had been set before the driving assistance system entered the low-speed following control mode 121. Conversely, if the vehicle speed increases to 40 km/h or higher while the driving assistance system is in the low-speed following control mode 121 but a set vehicle speed VC was not previously set, then text is displayed in the region 51 of the display monitor of the display device 34 stating that a set vehicle speed has not been set. Additionally, the numeric value "40 km/h" is displayed flashing in the region 56. Afterwards, the driving assistance system shifts to the distance control mode 118 when the vehicle speed VC is set by operating the vehicle speed up switch 9 and/or the vehicle speed down switch 10. If the set vehicle speed VC is not set, then the driving assistance system will execute control such that the vehicle follows the preceding vehicle at 40 km/h. Then, if the preceding vehicle stops being detected, then the driving assistance system shifts to the standby state 112.

The driving assistance system shifts from the vehicle speed control mode 115 to an override state 133 (mode shift 126) if the accelerator pedal actuation amount S increases to a prescribed value S0 or higher during the vehicle speed control mode 115. Meanwhile, the driving assistance system shifts to the vehicle speed control mode 115 (mode shift 127) if the accelerator pedal actuation amount S falls below the prescribed value S0 while the driving assistance system is in the override state 133, a preceding vehicle is not detected by the headway distance sensor 1, and the vehicle is traveling at 40 km/h or faster.

The driving assistance system shifts from the vehicle speed control mode 118 to the override state 133 (mode shift 128) if the accelerator pedal actuation amount S increases to a prescribed value S0 or higher during the vehicle speed control mode 118. Meanwhile, the driving assistance system shifts to the vehicle speed control mode 118 (mode shift 129) if the accelerator pedal actuation amount S falls below the prescribed value S0 while the driving assistance system is in the override state 133, a preceding vehicle is detected by the headway distance sensor 1, and the vehicle is traveling at 40 km/h or faster.

The driving assistance system shifts from the low-speed following control mode 121 to the override state 133 (mode shift 130) if the accelerator pedal actuation amount S increases to a prescribed value S0 or higher during the low-speed following control mode 121. Meanwhile, the driving assistance system shifts to the low-speed following control mode 121 (mode shift 131) if the accelerator pedal actuation amount S falls below the prescribed value S0 while the driving assistance system is in the override state 133, a preceding vehicle is detected by the headway distance sensor 1, and the vehicle is traveling at a speed below 40 km/h.

The driving assistance system shifts from the override state 133 to the standby state 112 (mode shift 132) if the accelerator pedal actuation amount S falls below the prescribed value S0 while the driving assistance system is in the override state 133, a preceding vehicle is not detected by the headway distance sensor 1, and the vehicle is traveling at a speed below 40 km/h or if the System B stop switch 12 is pressed or brake operation is detected by the brake pedal sensor 4 while the driving assistance system is in the override state 133.

In the override state 133, priority is given to driving operations performed by the driver over control executed by the vehicle driving assist system and System B does not execute preceding vehicle following control. Additionally, since the override state 133 occurs within the state 111, the RP conveyance control is not executed by System A. If vehicle traveling assistance system shifts to the override state 133 while the sound operating switch 15 is turned on, then the sound emitting device 35 issues voice message stating that System A is in the operation-OFF state and the driving assistance system has been overridden. When in the override state 133, the vehicle driving assist system executes an override reporting control (described later) in order to make the driver aware that System A is not operating (i.e., is in the operation-OFF state).

If the System A operating switch 6 is pressed while the vehicle driving assist system is in the state 111, the vehicle driving assist system shifts to a state 136 in which Systems A and B are both in the operation-ON state (state shift 134). If the System A operating switch 6 is pressed while the vehicle driving assist system is in the state 136, then the vehicle driving assist system shifts to the state 111 (state shift 135).

In the state 136, similarly to the state 111, the vehicle driving assist system normally gives priority to preceding vehicle following control executed by System B. In other words, the vehicle driving assist system (System B) executes control in accordance with a vehicle speed control mode 144, a distance control mode 147, and low-speed following control mode 150. In the standby state 137 of the state 136, similarly to the state 101, only System A executes control while System B does not execute control. In the standby state 137, the vehicle driving assist system shifts between a System A control-OFF mode 138 and a System A control-ON mode 139 (mode shifts 140 and 141) based on whether or not a preceding vehicle exists and the risk potential RP.

In the override state 162 of the state 136, the vehicle driving assist system gives priority to driving operations performed by the driver by not executing control with System B and only executing control with System A. In the override state 162, the vehicle driving assist system shifts between a System A control-OFF mode 163 and a System A control-ON mode 164 (mode shifts 165 and 166) based on whether or not a preceding vehicle exists and the risk potential RP. When in the override state 162, the vehicle driving assist system executes an override reporting control (described later) in order to make the driver aware that System A is operating (i.e., is in the operation-ON state).

If the value obtained by multiplying the risk potential RP by 1.5 (i.e., 1.5×RP) is equal to or larger than the system A control threshold value RP_sysA when the vehicle driving assist system shifts to the override state 162, the text saying "System A ON" in the region 55 of the display monitor of the display device 34 is displayed in a flashing manner in order to emphasize that System A is in the operation-ON state.

Within the state 136, the mode shifts 142, 143, 145, 146, 148, 149, and 151 to 161 executed among the standby state 137, the vehicle speed control mode 144, the distance control mode 147, the low-speed following control mode 150, and the override state 162 are executed in accordance with the same conditions as the mode shifts executed within the state 111.

Since the vehicle driving assist system in accordance with the first embodiment has Systems A and B, there is the possibility that control behavior contrary to the expectations of the driver will occur when the operating states of Systems A and B change. In particular, when System B is overridden, the vehicle behavior will differ from the driver's intent if System A does not execute control even though the driver expects System A to execute control or if System A does execute control even though the driver expects System A not to execute control.

Therefore, in the first embodiment, when System B is overridden, the vehicle driving assist system executes control contrived to make certain the driver is made aware when System A is operating or not operating. In order to inform the driver regarding the operating state (operation-ON or operation-OFF) of System A when System B is overridden, the vehicle driving assist system executes one of the override reporting control methods listed below (Methods 1 to 13).

Method 1: Reduce accelerator pedal reaction force when System A is not operating (i.e., System A operation-OFF).

Method 2: Increase throttle valve opening when System A is not operating (i.e., System A operation-OFF).

Method 3: Increase accelerator pedal reaction force when System A is operating (i.e., System A operation-ON).

Method 4: Vibrate accelerator pedal when System A is operating (i.e., System A operation-ON).

Method 5: Decrease throttle valve opening when System A is operating (i.e., System A operation-ON).

Method 6: Reduce accelerator pedal reaction force when System A is not operating (i.e., System A operation-OFF).

Method 7: Reduce accelerator pedal reaction force when System A is not operating (i.e., System A operation-OFF).

Method 8: Increase throttle valve opening when System A is not operating (i.e., System A operation-OFF).

Method 9: Increase accelerator pedal reaction force when System A is operating (i.e., System A operation-ON).

Method 10: Increase accelerator pedal reaction force when System A is operating (i.e., System A operation-ON).

Method 11: Decrease throttle valve opening when System A is operating (i.e., System A operation-ON).

Method 12: Reduce accelerator pedal reaction force and issue report using display and sound indicator when System A is not operating (i.e., System A operation-OFF).

Method 13: Increase accelerator pedal reaction force and issue report using display indicator, sound indicator, and pedal vibration when System A is operating (i.e., System A operation-ON).

The override reporting control of each of the methods will now be described in detail.

Method 1: Reduce Accelerator Pedal Reaction Force when System A is not Operating.

Figure 15:
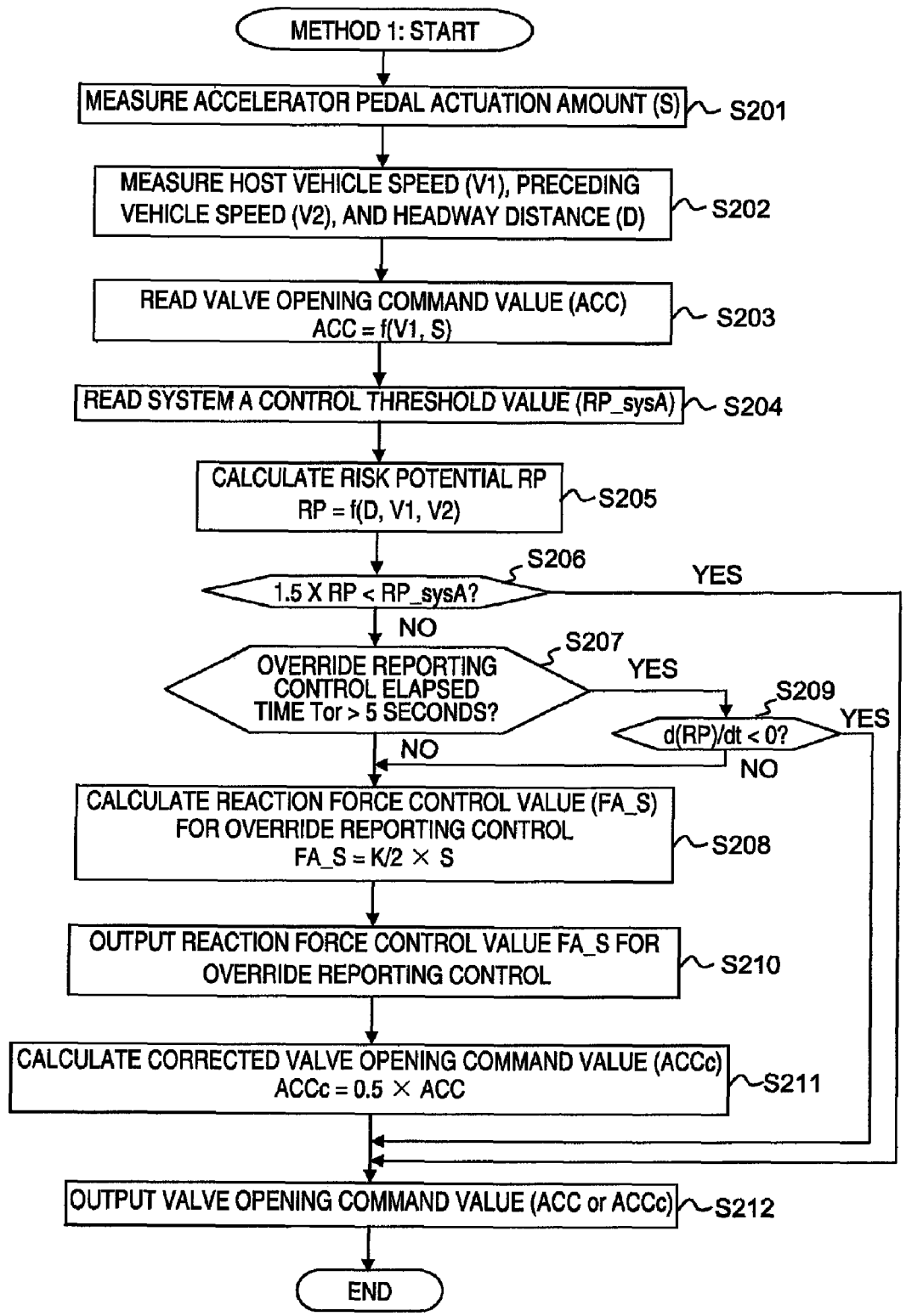
FIG. 15 is a flowchart showing the processing steps executed during override reporting control using Method 1 in accordance with the vehicle driving assist system of the present invention.

When the vehicle driving assist system is in the override state 133 of the state 111, this method serves to inform the driver that System A will not operate while System B is overridden by reducing the accelerator pedal reaction force. The operations executed by the vehicle driving assist system in such a case will now be explained with reference to the flowchart of FIG. 15. FIG. 15 is a flowchart showing the processing steps of a driving assistance control program executed by the control unit 20 when the vehicle driving assist system is in the override state 133. This control loop is executed continuously once per prescribed time period, e.g., every 50 msec.

In step S201, the control unit 20 reads in the accelerator pedal actuation amount S detected by the accelerator pedal stroke sensor 3. In step S202, the control unit 20 reads in the host vehicle speed V1, the preceding vehicle speed V2, and the headway distance D based on the detection signals from the headway distance sensor 1 and the vehicle speed sensor 2. In step S203, the control unit 20 reads in the throttle valve opening degree command value ACC, which is based on the accelerator pedal actuation amount S and the host vehicle speed V1 (i.e., ACC=f(V1, S)). The throttle valve opening degree command value ACC is set using a normal map configured to give the throttle valve opening degree command value ACC as a function of the accelerator pedal actuation amount S and the host vehicle speed V1 when braking/driving force control is not being executed by Systems A and B.

In step S204, the control unit 20 reads the control threshold value RP_sysA for System A. In step S205, the control unit 20 calculates the risk potential RP based on the host vehicle speed V1, the preceding vehicle speed V2, and the headway distance D using the previously mentioned Equation 3. In step S206, the control unit 20 determines if the value obtained by multiplying the risk potential RP calculated in step S205 by 1.5 (i.e., 1.5×RP) is smaller than the control threshold value RP_sysA.

If the value 1.5×Rp is equal to or larger than the threshold value RP_sysA (1.5×Rp≧RP_sysA), then the control unit 20 determines that the driver has incorrectly assumed that System A is operating even though System B is overridden and System A is not operating. If the value 1.5×Rp is smaller than the threshold value RP_sysA (1.5×Rp<RP_sysA), then the control unit 20 proceeds to step S212. In step S207, the control unit 20 determines if the override reporting control for informing the driver that System A is not operating has been continued for 5 seconds or longer. The override reporting control elapsed time Tor is the amount of time that has elapsed since the condition 1.5×RP≧RP_sysA occurred after the vehicle driving assist system shifted to the override state 133.

If the override reporting control elapsed time Tor is 5 seconds or below, then the control unit 20 proceeds to step S208. If the override reporting control elapsed time Tor is larger than 5 seconds, then the control unit 20 proceeds to step S209. In step S209, the control unit 20 determines if the risk potential RP has decreased. If the risk potential RP has not decreased (d(RP/dt≧0), then the control unit 20 proceeds to step S208. If the risk potential RP has decreased (d(RP/dt<0), then the control unit 20 proceeds to step S212.

In step S208, the control unit 20 calculates a reaction force command value FA_S for executing the override reporting control. When the accelerator pedal reaction force control is not executed by System A, the accelerator pedal 3a exerts the normal reaction force generated by the spring force of the torsion spring in accordance with the accelerator pedal actuation amount S. The normal reaction force F is expressed in terms of the spring constant K of the torsion spring and the accelerator pedal actuation amount S as shown in Equation 4 below.

$$F = K \times S \quad \text{(Equation 4)}$$

The reaction force command value FA_S can be calculated using Equation 5 below.

$$FA\_S = K/2 \times S \quad \text{(Equation 5)}$$

In step S210, the control unit 20 sends the reaction force control command value FA_S calculated in step S208 to the accelerator pedal reaction force controller 33. The accelerator pedal reaction force controller 33 controls the actuator 3b based on the reaction force command value FA_S. Thus, during override reporting control, the vehicle driving assist system enables the driver to operate (depress) the accelerator pedal 3a with half the normal depression force by generating an assisting force FA_S equivalent to half of the normal reaction force F instead of the full amount of the normal reaction force F.

In step S211, a corrected value ACCc of the valve opening command value ACC is calculated using Equation 6 below.

$$ACCc = 0.5 \times ACC \quad \text{(Equation 6)}$$

In step S212, the control unit 20 sends the corrected valve opening command value ACCc calculated in step S211 or the valve opening command value ACC read in step S203 to the engine controller 31. In this way, while the accelerator pedal reaction force is being reduced by the override reporting control, the throttle valve opening degree that results from a given depression amount of the accelerator pedal 3a is reduced by half in comparison with the normal throttle opening characteristic. After the command value is sent, the current control loop ends.

Method 2: Increase Throttle Valve Opening when System A is not Operating.

Figure 16:
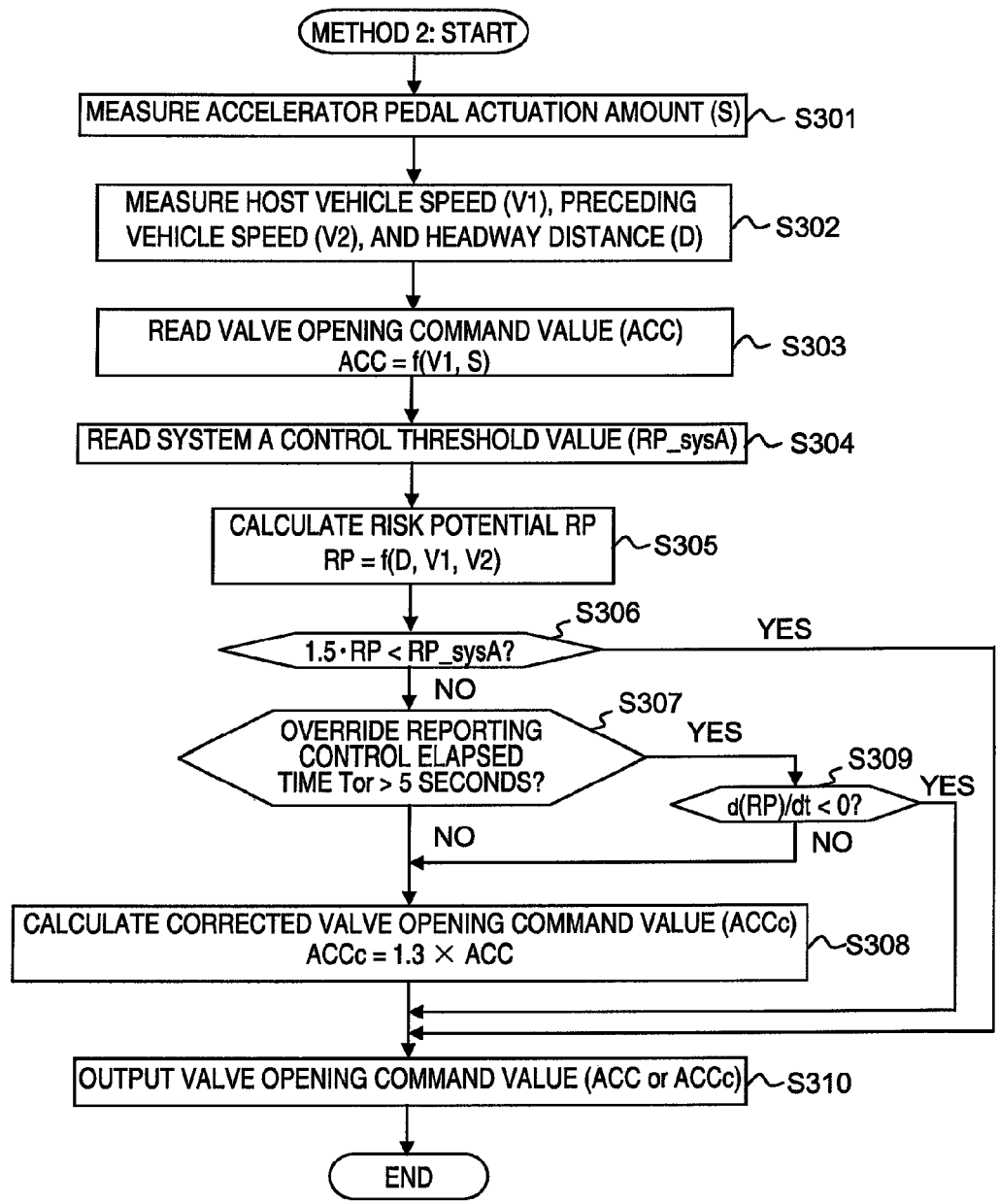
FIG. 16 is a flowchart showing the processing steps executed during override reporting control using Method 2 in accordance with the vehicle driving assist system of the present invention.

When the vehicle driving assist system is in the override state 133 of the state 111, this method serves to inform the driver that System A will not operate while System B is overridden by changing the opening characteristic of the throttle valve with respect to the accelerator pedal actuation amount S. The operations executed by the vehicle driving assist system in such a case will now be explained with reference to the flowchart of FIG. 16. FIG. 16 is a flowchart showing the processing steps of a driving assistance control program executed by the control unit 20 when the vehicle driving assist system is in the override state 133. This control loop is executed continuously once per prescribed time period, e.g., every 50 msec. The processing of the steps S301 to S307 is the same as in the steps S3201 to S207 of the flowchart shown in FIG. 15 and explanations of these steps are omitted for the sake of brevity.

In step S307, the control unit 20 determines if the override reporting control elapsed time Tor is 5 sections or less. If so, the control unit 20 proceeds to step S308. If the override reporting control elapsed time Tor is larger than 5 seconds, then the control unit 20 proceeds to step S309. In step S309, the control unit 20 determines if the risk potential RP has decreased (d(RP)/dt<0). If not (d(RP)/dt≧0), then the control unit 20 proceeds to step S308. If so (d(RP)/dt<0), then the control unit 20 proceeds to step S310.

In step S308, a corrected value ACCc of the valve opening command value ACC is calculated using Equation 7 below.

$$ACCc = 1.3 \times ACC \quad \text{(Equation 7)}$$

In step S310, the control unit 20 sends the corrected valve opening command value ACCc calculated in step S308 or the valve opening command value ACC read in step S303 to the engine controller 31. In this way, during the override reporting control, the throttle valve opening characteristic is corrected such that the throttle valve opening degree that results from a given accelerator pedal actuation amount S is increased. After the command value is sent, the current control loop ends.

Method 3: Increase Accelerator Pedal Reaction Force when System A is Operating.

Figure 17:
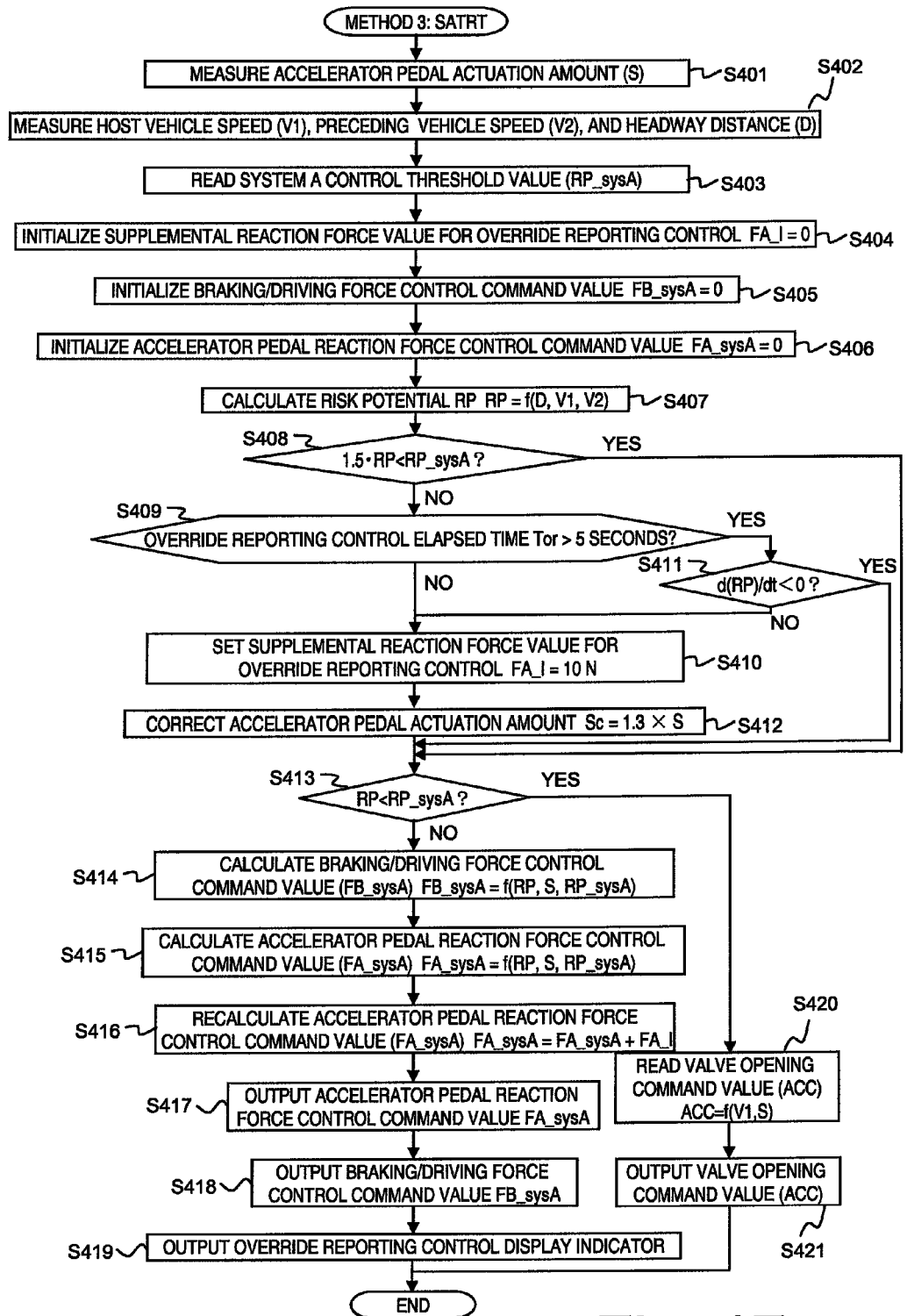
FIG. 17 is a flowchart showing the processing steps executed during override reporting control using Method 3 in accordance with the vehicle driving assist system of the present invention.

When the vehicle driving assist system is in the override state 162 of the state 136, this method serves to inform the driver that System A will operate while System B is overridden by increasing the accelerator pedal reaction force. The operations executed by the vehicle driving assist system in such a case will now be explained with reference to the flowchart of FIG. 17. FIG. 17 is a flowchart showing the processing steps of a driving assistance control program executed by the control unit 20 when the vehicle driving assist system is in the override state 162. This control loop is executed continuously once per prescribed time period, e.g., every 50 msec.

In step S401, the control unit 20 reads in the accelerator pedal actuation amount S detected by the accelerator pedal stroke sensor 3. In step S402, the control unit 20 reads in the host vehicle speed V1, the preceding vehicle V2, and the headway distance D based on the detection signals from the headway distance sensor 1 and the vehicle speed sensor 2. In step S403, the control unit 20 reads the control threshold value RP_sysA for System A.

In step S404, the control unit 20 initializes a supplemental reaction force value FA_I for increasing the accelerator pedal reaction force during override reporting control (FA_I=0). In step S405, the control unit 20 initializes the braking/driving force control command value FB_sysA for System A (FB_sysA=0). In step S406, the control unit 20 initializes the accelerator pedal reaction force control command value FA_sysA for System A (FA_sysA=0).

In step S407, the control unit 20 calculates the risk potential RP based on the host vehicle speed V1, the preceding vehicle speed V2, and the headway distance D using the previously mentioned Equation 3. In step S408, the control unit 20 determines if the value obtained by multiplying the risk potential RP calculated in step S407 by 1.5 (i.e., 1.5×RP) is smaller than the system A control threshold value RP_sysA.

If the value 1.5×RP is equal to or larger than the threshold value RP_sysA (1.5×RP≧RP_sysA), then the control unit 20 proceeds to step S409 to inform the driver that System A will operate. If the value 1.5×Rp is smaller than the threshold value RP_sysA (1.5×Rp<RP_sysA), then the control unit 20 proceeds to step S413.

In step S409, the control unit 20 determines if the override reporting control for informing the driver that System A is operating has been continued for 5 seconds or longer. If the override reporting control elapsed time Tor is 5 seconds or below, then the control unit 20 proceeds to step S410. If the override reporting control elapsed time Tor is larger than 5 seconds, then the control unit 20 proceeds to step S411. In step S411, the control unit 20 determines if the risk potential RP has decreased. If the risk potential RP is has not decreased (d(RP)/dt≧0), then the control unit 20 proceeds to step S410. If the risk potential RP has decreased (d(RP/dt<0), then the control unit 20 proceeds to step S413.

In step S410, the control unit sets the supplemental reaction force value FA_I for override reporting control to a prescribed value, e.g., 10 N. In step S412, the control unit 20 corrects the accelerator pedal actuation amount S read in step S401. The corrected value Sc of the accelerator pedal actuation amount S is expressed as shown in Equation 8 below.

$$Sc = 1.3 \times S \quad \text{(Equation 8)}$$

In step S413, the control unit 20 determines if the risk potential RP is smaller than the system A control threshold value RP_sysA. If the risk potential RP is equal to or larger than the threshold value RP_sysA (RP≧RP_sysA), then the control unit 20 proceeds to step S414 to execute braking/driving force control and accelerator pedal reaction force control using System A (System A control-ON mode 164). If the risk potential RP is smaller than the threshold value RP_sysA (RP<RPsysA), then the control unit 20 proceeds to step S420 (System A control-OFF mode 163).

In step S414, the control unit 20 calculates the braking/driving force control command value FB_sysA based on the risk potential RP and the accelerator pedal actuation amount S or corrected value Sc thereof. Since the corrected value Sc used during override reporting control is 1.3 times the accelerator pedal actuation amount S, the driving force generated by the braking/driving force control is larger than when override reporting control is not executed.

Figure 8:
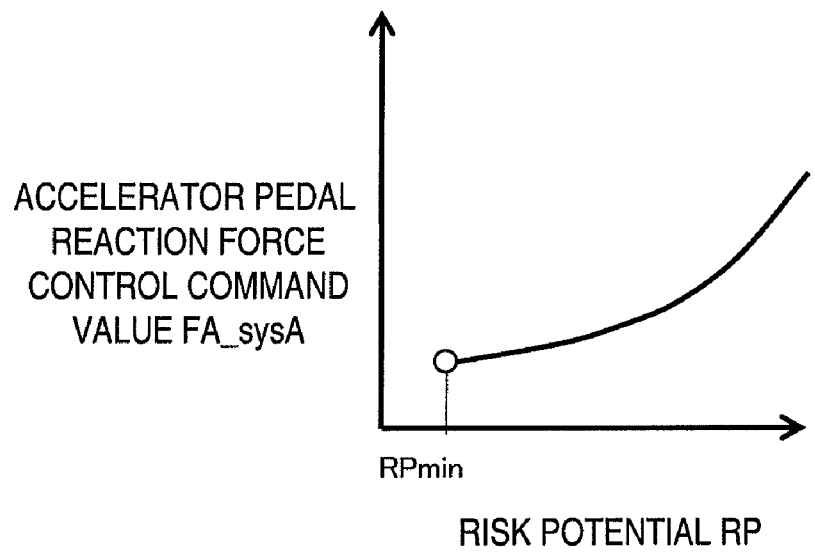
FIG. 8 is a graph plotting the accelerator pedal reaction force control command value versus the risk potential in accordance with the vehicle driving assist system of the present invention.

In step S415, the control unit 20 calculates the accelerator pedal reaction force control command value FA_sysA using the map shown in FIG. 8 based on the risk potential RP and the accelerator pedal actuation amount S or corrected value Sc thereof. In step S416, the control unit 20 recalculates the reaction force control command value FA_sysA using the supplemental reaction force value FA_I set in step S410 and the reaction force control command value FA_sysA calculated in step S415. More specifically, the reaction force control command value FA_sysA is recalculated by adding the supplemental reaction force value FA_I to the reaction force control command value FA_sysA calculated in step S415 (FA_sysA=FA_sysA+FA_I).

In step S417, the control unit 20 sends the accelerator pedal reaction force control command value FA_sysA recalculated in step S416 to the accelerator pedal reaction force control device 33. In step S418, the control unit 20 sends the braking/driving force control command value FB_sysA calculated in step S414 to the engine controller 31 and the brake controller 32. In step S419, the control unit 20 sends a signal to the display device 34 instructing the display device 34 to indicate that System A is in the operation-ON state while the vehicle driving assist system is in the override state 162. The indicator displayed on the display monitor of the display device 34 as shown in each of the diagrams (a) to (c) of FIG. 10 depends on the set spring length D_sysA. If override reporting control is being executed (1.5×RP≧RP_sysA), the text (System A ON) displayed in the region 55 is flashed.

In step S420, the control unit 20 reads in the throttle valve opening degree command value ACC, which is based on the accelerator pedal actuation amount S or corrected value Sc and the host vehicle speed V1 (i.e., ACC=f(V1, S)). In step S421, the control unit 20 sends the valve opening command value ACC to the engine controller 31. After the command value is sent, the current control loop ends.

Method 4: Vibrate Accelerator Pedal when System A is Operating.

Figure 18:
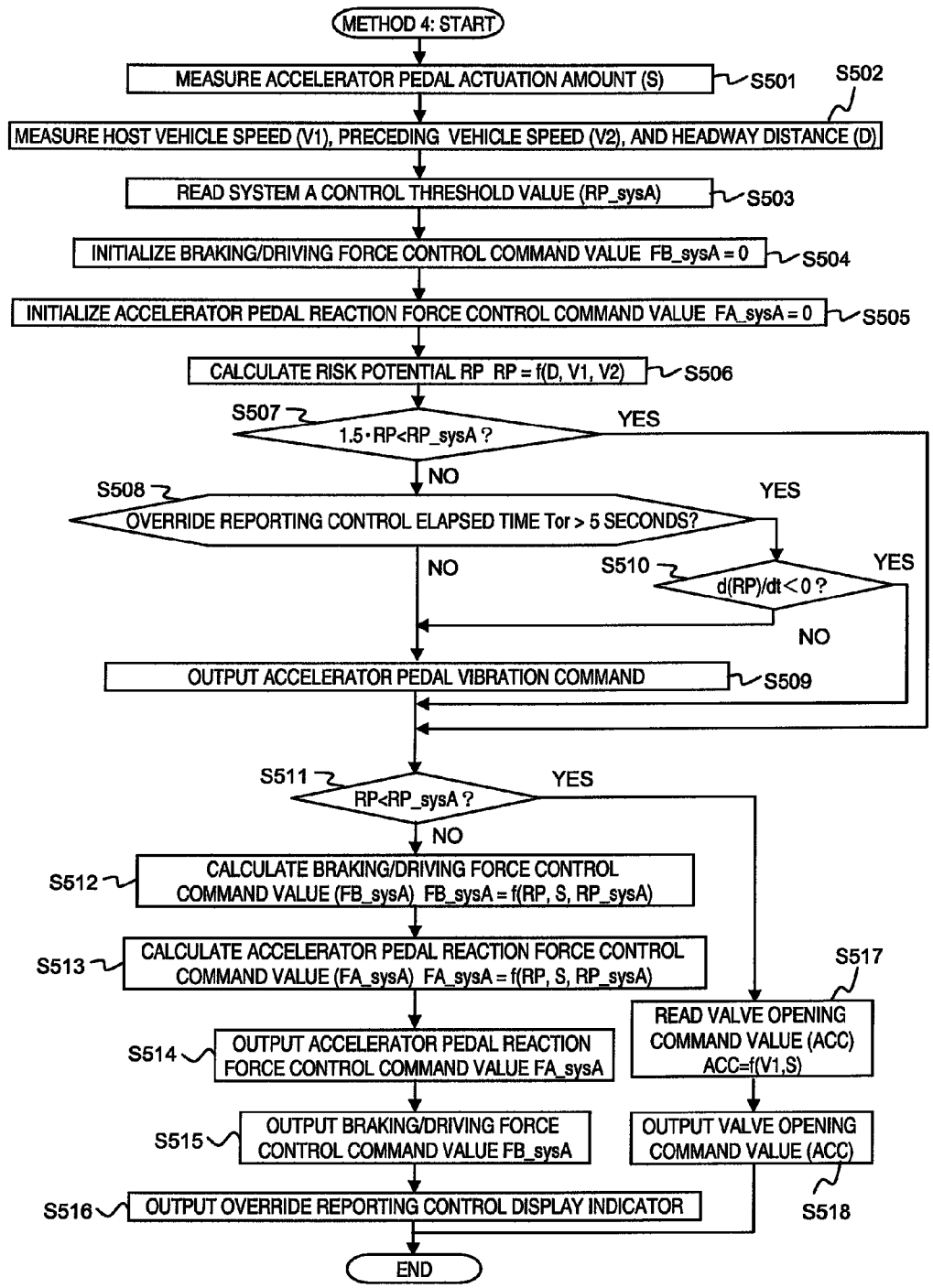
FIG. 18 is a flowchart showing the processing steps executed during override reporting control using Method 4 in accordance with the vehicle driving assist system of the present invention.

When the vehicle driving assist system is in the override state 162 of the state 136, this method serves to inform the driver that System A will operate while System B is overridden by generating a vibration in the accelerator pedal 3*a*. The operations executed by the vehicle driving assist system in such a case will now be explained with reference to the flowchart of FIG. 18. FIG. 18 is a flowchart showing the processing steps of a driving assistance control program executed by the control unit 20 when the vehicle driving assist system is in the override state 162. This control loop is executed continuously once per prescribed time period, e.g., every 50 msec.

In step S501, the control unit 20 reads in the accelerator pedal actuation amount S detected by the accelerator pedal stroke sensor 3. In step S502, the control unit 20 reads in the host vehicle speed V1, the preceding vehicle V2, and the headway distance D based on the detection signals from the headway distance sensor 1 and the vehicle speed sensor 2. In step S503, the control unit 20 reads the control threshold value RP_sysA for System A. In step S504, the control unit 20 initializes the braking/driving force control command value FB_sysA for System A (FB_sysA=0). In step S505, the control unit 20 initializes the accelerator pedal reaction force control command value FA_sysA for System A (FA_sysA=0).

In step S506, the control unit 20 calculates the risk potential RP based on the host vehicle speed V1, the preceding vehicle speed V2, and the headway distance D using the previously mentioned Equation 3. In step S507, the control unit 20 determines if the value obtained by multiplying the risk potential RP calculated in step S506 by 1.5 (i.e., 1.5×RP) is smaller than the system A control threshold value RP_sysA.

If the value 1.5×RP is equal to or larger than the threshold value RP_sysA (1.5×RP≧RP_sysA), then the control unit 20 proceeds to step S508 to inform the driver that System A will operate. If the value 1.5×Rp is smaller than the threshold value RP_sysA (1.5×Rp<RP_sysA), then the control unit 20 proceeds to step S511.

In step S508, the control unit 20 determines if the override reporting control for informing the driver that System A is operating has been continued for 5 seconds or longer. If the override reporting control elapsed time Tor is 5 seconds or below, the control unit 20 proceeds to step S509. If the override reporting control elapsed time Tor is larger than 5 seconds, the control unit 20 proceeds to step S510. In step S510, the control unit 20 determines if the risk potential RP has decreased. If the risk potential RP has not decreased (d(RP)/dt≧0), then the control unit 20 proceeds to step S509. If the risk potential RP has decreased (d(RP/dt<0), then the control unit 20 proceeds to step S511.

Figure 19:
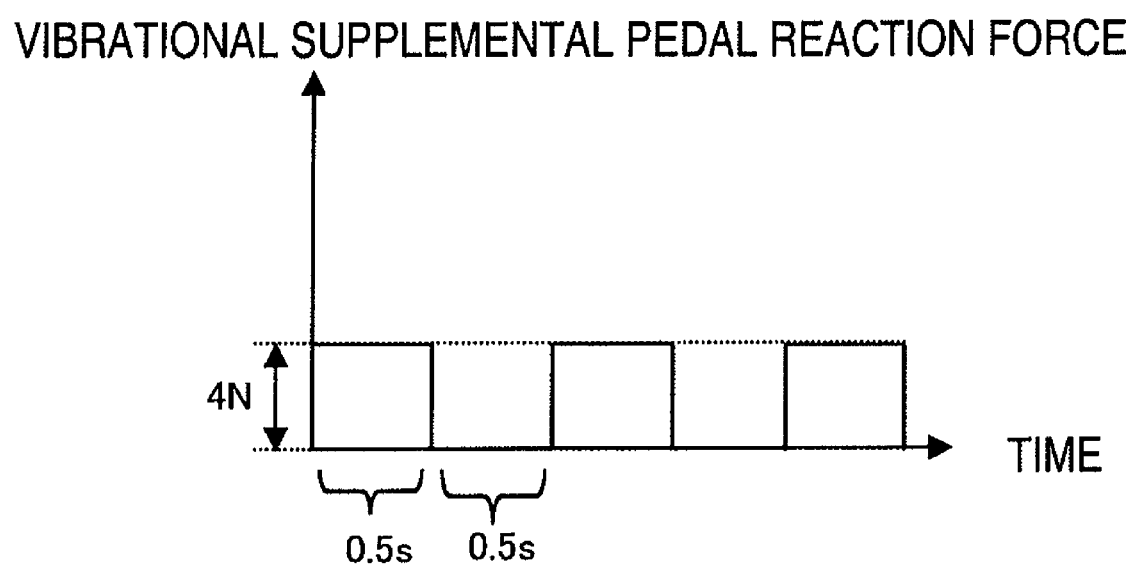
FIG. 19 illustrates an example of how a supplemental vibrational reaction force applied to the accelerator pedal changes with time.

In step S509, the control unit 20 sends a signal to the vibrator 36 instructing the vibrator 36 to generate a vibration in the accelerator pedal 3a. The vibrator 36 generates a vibration in the accelerator pedal 3a in accordance with the command from the control unit 20. Instead of using the vibrator 36, it is also possible to generate a vibration in the accelerator pedal 3a by adding a continuous square wave to the accelerator pedal reaction force command value FA_sysA, as shown in FIG. 19. When a supplemental vibrating reaction force is added in order to generate the vibration, the magnitude of the supplemental vibrating reaction force is, for example, 4 N and the on-time and off-interval are, for example, both 0.5 second.

In step S511, the control unit 20 determines if the risk potential RP is smaller than the system A control threshold value RP_sysA. If the risk potential RP is equal to or larger than the threshold value (RP≧RP_sysA), then the control unit 20 proceeds to step S512 to execute braking/driving force control and accelerator pedal reaction force control using System A (System A control-ON mode 164). If the risk potential RP is smaller than the threshold value RP_sysA (RP<RPsysA), then the control unit 20 proceeds to step S517 (System A control-OFF mode 163).

In step S512, the control unit 20 calculates the braking/driving force control command value FB_sysA based on the risk potential RP and the accelerator pedal actuation amount S. In step S513, the control unit 20 calculates the accelerator pedal reaction force control command value FA_sysA using the map shown in FIG. 8 based on the risk potential RP and the accelerator pedal actuation amount S. In step S514, the control unit 20 sends the accelerator pedal reaction force control command value FA_sysA calculated in step S513 to the accelerator pedal reaction force control device 33. In step S515, the control unit 20 sends the braking/driving force control command value FB_sysA calculated in step S512 to the engine controller 31 and the brake controller 32. In step S516, the control unit 20 sends a signal to the display device 34 instructing the display device 34 to indicate that System A is in the operation-ON state while the vehicle driving assist system is in the override state 162. The indicator displayed on the display monitor of the display device 34 as shown in each of the diagrams (a) to (c) of FIG. 10 than depends on the set spring length D_sysA. If override assistance control is being executed (1.5×RP≧RP_sysA), the text (System A ON) displayed in the region 55 is flashed.

In step S517, the control unit 20 reads in the throttle valve opening degree command value ACC, which is based on the accelerator pedal actuation amount S and the host vehicle speed V1 (i.e., ACC=f(V1, S)). In step S518, the control unit 20 sends the valve opening command value ACC to the engine controller 31. After the command value is sent, the current control loop ends.

Method 5: Decrease Throttle Valve Opening when System A is Operating.

Figure 20:
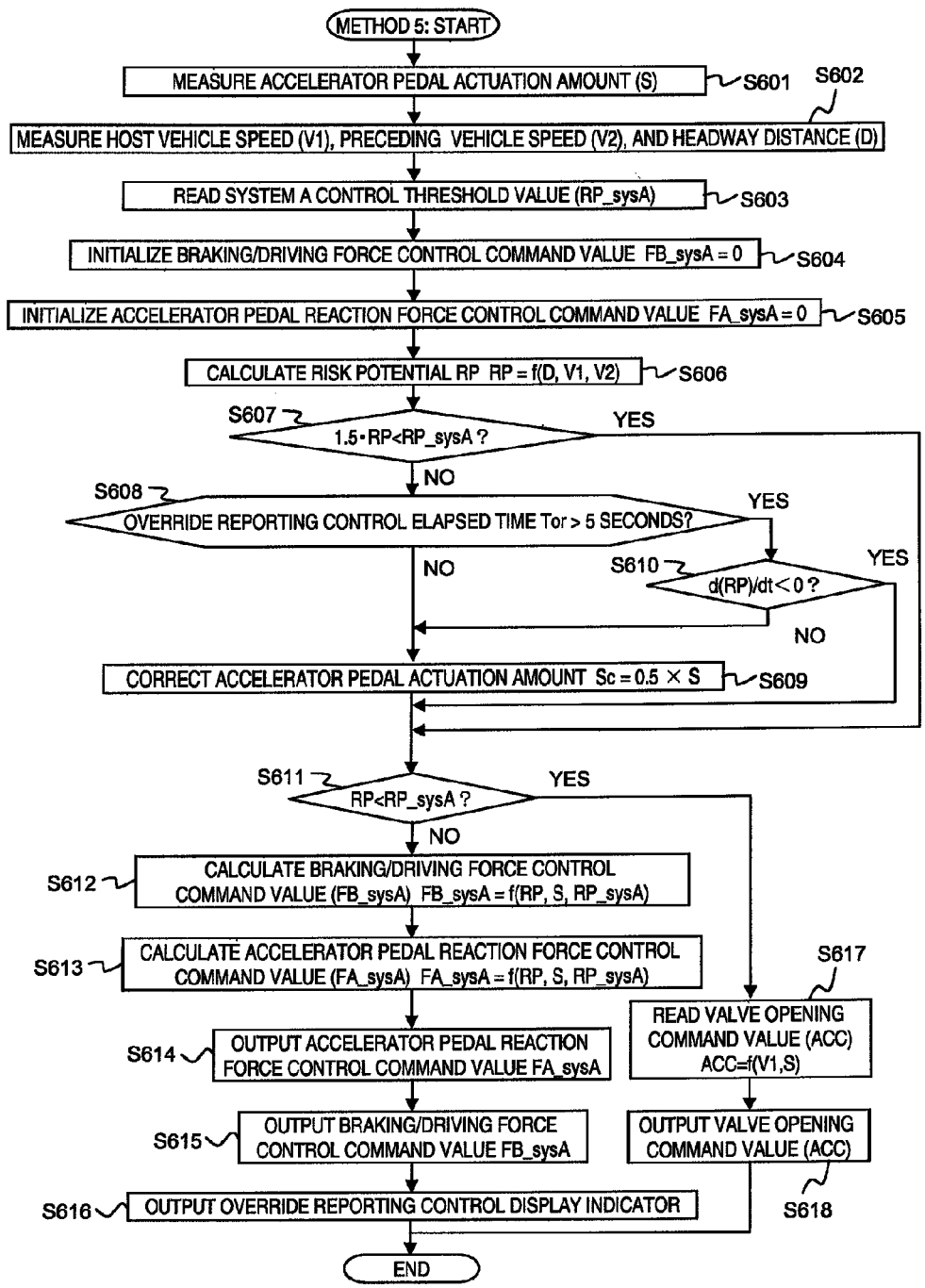
FIG. 20 is a flowchart showing the processing steps executed during override reporting control using Method 5 in accordance with the vehicle driving assist system of the present invention.

When the vehicle driving assist system is in the override state 162 of the state 136, this method serves to inform the driver that System A will operate while System B is overridden by reducing the throttle valve opening with respect to the accelerator pedal actuation amount S. The operations executed by the vehicle driving assist system in such a case will now be explained with reference to the flowchart of FIG. 20. FIG. 20 is a flowchart showing the processing steps of the driving assistance control program executed by the control unit 20 when the vehicle driving assist system is in the override state 162. This control loop is executed continuously once per prescribed time period, e.g., every 50 msec.

In step S601, the control unit 20 reads in the accelerator pedal actuation amount S detected by the accelerator pedal stroke sensor 3. In step S602, the control unit 20 reads in the host vehicle speed V1, the preceding vehicle V2, and the headway distance D based on the detection signals from the headway distance sensor 1 and the vehicle speed sensor 2. In step S603, the control unit 20 reads the control threshold value RP_sysA for System A. In step S604, the control unit 20 initializes the braking/driving force control command value FB_sysA for System A (FB_sysA=0). In step S605, the control unit 20 initializes the accelerator pedal reaction force control command value FA_sysA for System A (FA_sysA=0).

In step S606, the control unit 20 calculates the risk potential RP based on the host vehicle speed V1, the preceding vehicle speed V2, and the headway distance D using the previously mentioned Equation 3. In step S607, the control unit 20 determines if the value obtained by multiplying the risk potential RP calculated in step S606 by 1.5 (i.e., 1.5×RP) is smaller than the system A control threshold value RP_sysA.

If the value 1.5×RP is equal to or larger than the threshold value RP_sysA (1.5×RP≧RP_sysA), then the control unit 20 proceeds to step S608 to inform the driver that System A will operate. If the value 1.5×Rp is smaller than the threshold value RP_sysA (1.5×Rp<RP_sysA), then the control unit 20 proceeds to step S611. In step S608, the control unit 20 determines if the override reporting control for informing the driver that System A is operating has been continued for 5 seconds or longer. If the override reporting control elapsed time Tor is 5 seconds or below, then the control unit 20 proceeds to step S609. If the override reporting control elapsed time Tor is larger than 5 seconds, the control unit 20 proceeds to step S610. In step S610, the control unit 20 determines if the risk potential RP has decreased. If the risk potential RP is has not decreased (d(RP)/dt≧0), then the control unit 20 proceeds to step S609. If the risk potential RP has decreased (d(RP/dt<0)), then the control unit 20 proceeds to step S611.

In step S609, the control unit 20 corrects the accelerator pedal actuation amount S read in step S601. The corrected value Sc of the accelerator pedal actuation amount S is expressed as shown in Equation 9 below.

$$Sc = 0.5 \times S \qquad \text{(Equation 9)}$$

In step S611, the control unit 20 determines if the risk potential RP is smaller than the system A control threshold value RP_sysA. If the risk potential RP is equal to or larger than the threshold value (RP≧RP_sysA), then the control unit 20 proceeds to step S612 to execute braking/driving force control and accelerator pedal reaction force control using System A (System A control-ON mode 164). If the risk potential RP is smaller than the threshold value RP_sysA (RP<RPsysA), then the control unit 20 proceeds to step S617 (System A control-OFF mode 163).

In step S612, the control unit 20 calculates the braking/driving force control command value FB_sysA based on the risk potential RP and the accelerator pedal actuation amount S or corrected value Sc thereof. Since the corrected value Sc used during override reporting control is 0.5 times the accelerator pedal actuation amount S, the driving force generated by the braking/driving force control is smaller than when override reporting control is not executed. In step S613, the control unit 20 calculates the accelerator pedal reaction force control command value FA_sysA using the map shown in FIG. 8 based on the risk potential RP and the accelerator pedal actuation amount S or corrected value Sc thereof.

In step S614, the control unit 20 sends the accelerator pedal reaction force control command value FA_sysA calculated in step S613 to the accelerator pedal reaction force control device 33. In step S615, the control unit 20 sends the braking/driving force control command value FB_sysA calculated in step S612 to the engine controller 31 and the brake controller 32. In step S616, the control unit 20 sends a signal to the display device 34 instructing the display device 34 to indicate that System A is in the operation-ON state while the vehicle driving assist system is in the override state 162. The indicator displayed on the display monitor of the display device 34 as shown in each of the diagrams (a) to (c) of FIG. 10 depends on the set spring length D_sysA. If override reporting control is being executed (1.5×RP≧RP_sysA), the text (System A ON) displayed in the region 55 is flashed.

In step S617, the control unit 20 reads in the throttle valve opening degree command value ACC, which is based on the accelerator pedal actuation amount S or corrected value Sc and the host vehicle speed V1 (i.e., ACC=f(V1, S)). In step S618, the control unit 20 sends the valve opening command value ACC to the engine controller 31. After the command value is sent, the current control loop ends.

Method 6: Reduce Accelerator Pedal Reaction Force when System A is not Operating.

Figure 21:
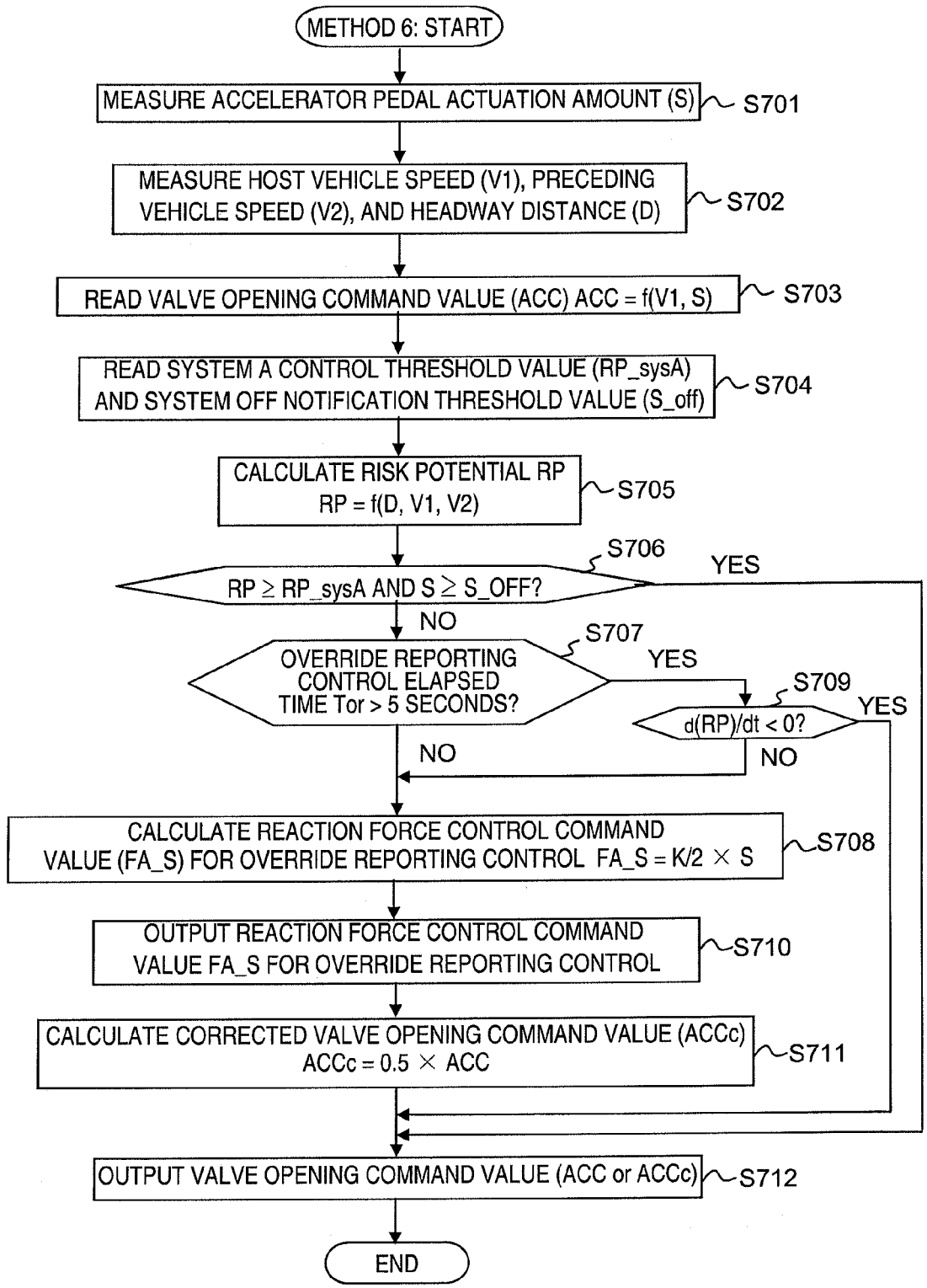
FIG. 21 is a flowchart showing the processing steps executed during override reporting control using Method 6 in accordance with the vehicle driving assist system of the present invention.

When the vehicle driving assist system is in the override state 133 of the state 1111, this method serves to inform the driver that System A will not operate while System B is overridden by reducing the accelerator pedal reaction force. The operations executed by the vehicle driving assist system in such a case will now be explained with reference to the flowchart of FIG. 21. FIG. 21 is a flowchart showing the processing steps of a driving assistance control program executed by the control unit 20 when the vehicle driving assist system is in the override state 133. This control loop is executed continuously once per prescribed time period, e.g., every 50 msec.

In step S701, the control unit 20 reads in the accelerator pedal actuation amount S detected by the accelerator pedal stroke sensor 3. In step S702, the control unit 20 reads in the host vehicle speed V1, the preceding vehicle V2, and the headway distance D based on the detection signals from the headway distance sensor 1 and the vehicle speed sensor 2. In step S703, the control unit 20 reads in the throttle valve opening degree command value ACC, which is based on the accelerator pedal actuation amount S and the host vehicle speed V1 (i.e., ACC=f(V1, S)).

In step S704, the control unit 20 reads the control threshold value RP_sysA for System A and a system OFF notification threshold value S_off. The system OFF notification threshold value S_off is a threshold value of the accelerator pedal actuation amount S for determining if the driver should be informed that System A is in the operation-OFF state. The threshold value S_off is set to, for example, approximately 40% of the actuation amount S corresponding to full depression of the accelerator pedal 3a (i.e., if the full depression actuation amount S is expressed as 100%, the threshold value S_off is set to approximately 40%). In step S705, the control unit 20 calculates the risk potential RP based on the host vehicle speed V1, the preceding vehicle speed V2, and the headway distance D using the previously mentioned Equation 3.

In step S706, the control unit 20 determines if the risk potential RP calculated in step S705 is equal to or larger than the System A control threshold value RP_sysA and the accelerator pedal actuation amount S is equal to or larger than the system OFF notification threshold value S_off. If the risk potential RP is equal to or larger than the threshold value RP_sysA (RP≧RP_sysA) and the actuation amount S is equal to or larger than the threshold value S_off (S≧S_off), then the control unit 20 determines that the driver mistakenly thinks System A is in the operation-ON state and expects System A to execute control. Therefore, the control unit 20 proceeds to step S707 to make the driver aware that System A will not operate. If the risk potential RP is smaller than the threshold value RP_sysA (RP<RP_sysA) or the actuation amount S is smaller than the threshold value S_off (S<S_off), then the control unit 20 proceeds to step S712.

The processing of the steps S707 to S712 is the same as in the steps S207 to S212 of the flowchart shown in FIG. 15 and explanations of these steps are omitted for the sake of brevity.

Method 7: Reduce Accelerator Pedal Reaction Force when System A is not Operating.

Figure 22:
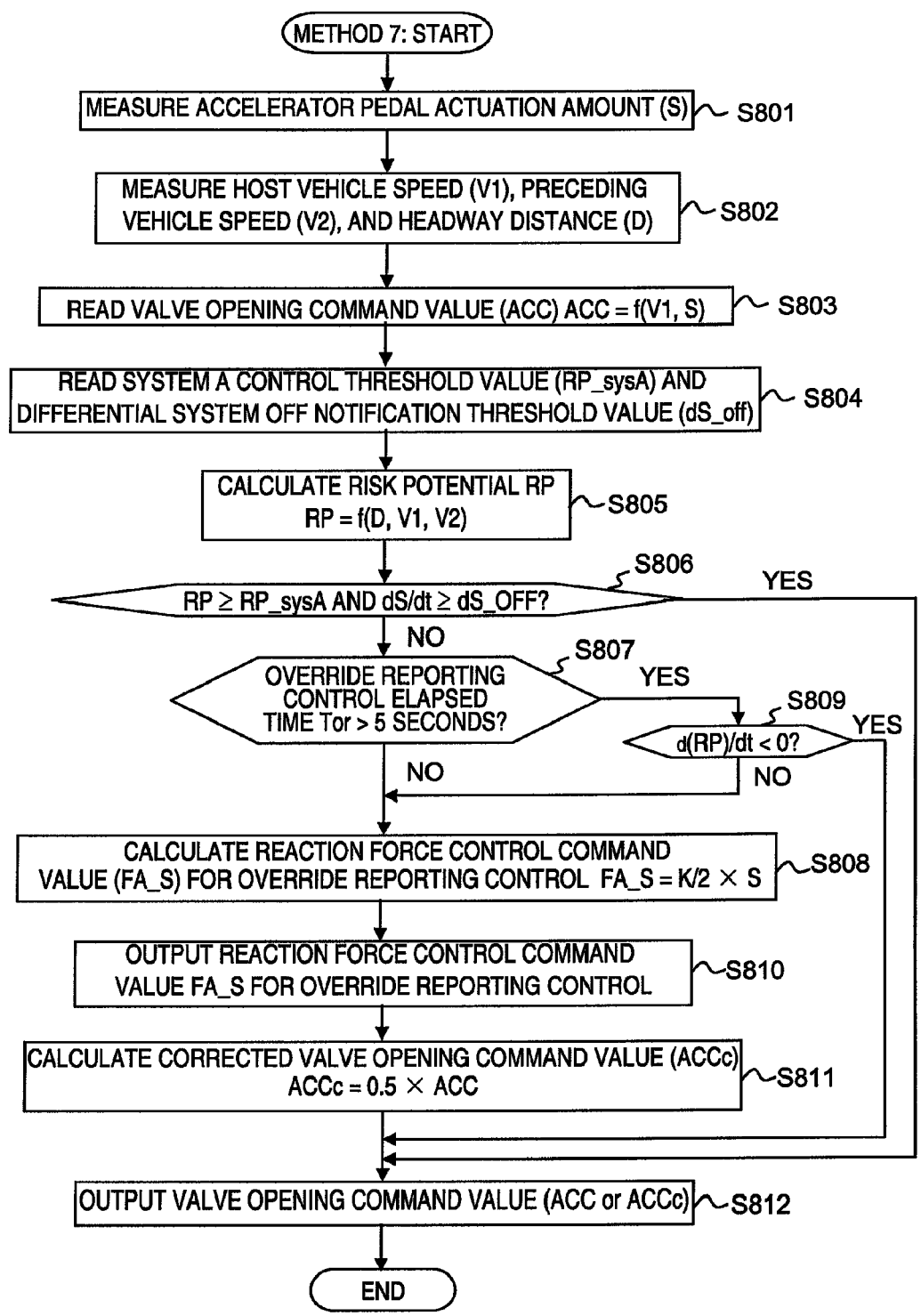
FIG. 22 is a flowchart showing the processing steps executed during override reporting control using Method 7 in accordance with the vehicle driving assist system of the present invention.

When the vehicle driving assist system is in the override state 133 of the state 111, this method serves to inform the driver that System A will not operate while System B is overridden by reducing the accelerator pedal reaction force. The operations executed by the vehicle driving assist system in such a case will now be explained with reference to the flowchart of FIG. 22. FIG. 22 is a flowchart showing the processing steps of a driving assistance control program executed by the control unit 20 when the vehicle driving assist system is in the override state 133. This control loop is executed continuously once per prescribed time period, e.g., every 50 msec.

In step S801, the control unit 20 reads in the accelerator pedal actuation amount S detected by the accelerator pedal stroke sensor 3. In step S802, the control unit 20 reads in the host vehicle speed V1, the preceding vehicle V2, and the headway distance D based on the detection signals from the headway distance sensor 1 and the vehicle speed sensor 2. In step S803, the control unit 20 reads in the throttle valve opening degree command value ACC, which is based on the accelerator pedal actuation amount S and the host vehicle speed V1 (i.e., ACC=f(V1, S)).

In step S804, the control unit 20 reads the control threshold value RP_sysA for System A and a differential system OFF notification threshold value dS_off. The differential system OFF notification threshold value dS_off is a threshold value of the actuation rate dS/dt of the accelerator pedal 3a for determining if the driver should be informed that System A is in the operation-OFF state. The threshold value dS_off is set to, for example, a rate dS/dt of 200%/second. The threshold value dS_off of 200%/second corresponds the actuation rate dS/dt at which the accelerator pedal actuation amount S will reach 100%, i.e., the accelerator pedal 3a will reach a fully depressed state, in 0.5 second. In step S805, the control unit 20 calculates the risk potential RP based on the host vehicle speed V1, the preceding vehicle speed V2, and the headway distance D using the previously mentioned Equation 3.

In step S806, the control unit 20 determines if the risk potential RP calculated in step S805 is equal to or larger than the System A control threshold value RP_sysA and the accelerator pedal actuation rate dS/dt is equal to or larger than the differential system OFF notification threshold value dS_off. If the risk potential RP is equal to or larger than the threshold value RP_sysA (RP≧RP_sysA) and the actuation rate dS/dt is equal to or larger than the threshold value dS_off (dS/dt≧dS_off), then the control unit 20 determines that the driver mistakenly thinks System A is in the operation-ON state and expects System A to execute control. Therefore, the control unit 20 proceeds to step S807 to make the driver aware that System A will not operate. If the risk potential RP is smaller than the threshold value RP_sysA (RP<RP_sysA) or the actuation rate dS/dt is smaller than the threshold value dS_off (dS/dt<dS_off), then the control unit 20 proceeds to step S812.

The processing of the steps S807 to S812 is the same as in the steps S207 to S212 of the flowchart shown in FIG. 15 and explanations of these steps are omitted for the sake of brevity.

Method 8: Increase Throttle Valve Opening when System A is not Operating.

Figure 23:
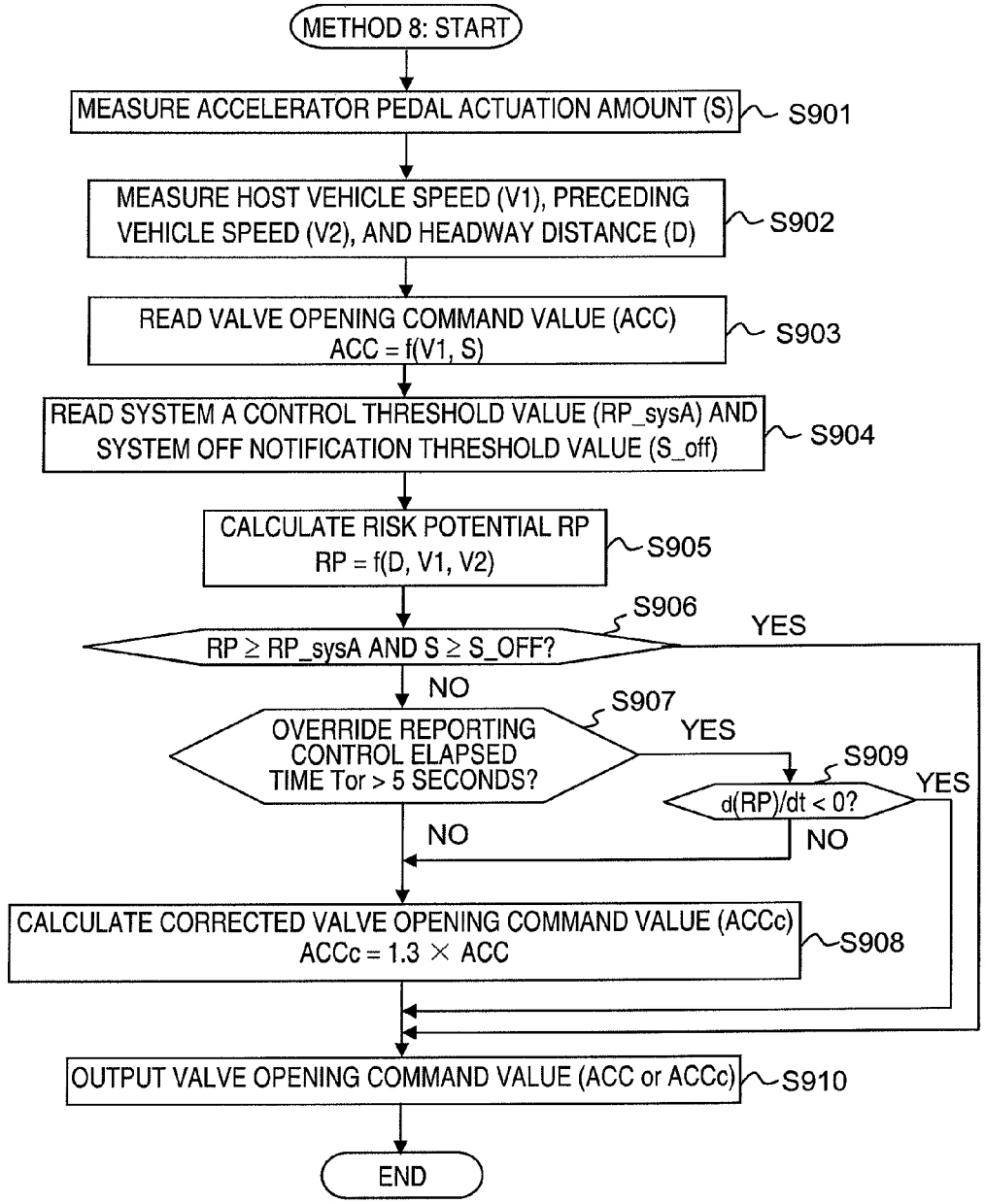
FIG. 23 is a flowchart showing the processing steps executed during override reporting control using Method 8 in accordance with the vehicle driving assist system of the present invention.

When the vehicle driving assist system is in the override state 133 of the state 111, this method serves to inform the driver that System A will not operate while System B is overridden by changing the opening characteristic of the throttle valve with respect to the accelerator pedal actuation amount. The operations executed by the vehicle driving assist system in such a case will now be explained with reference to the flowchart of FIG. 23. FIG. 23 is a flowchart showing the processing steps of a driving assistance control program executed by the control unit 20 when the vehicle driving assist system is in the override state 133. This control loop is executed continuously once per prescribed time period, e.g., every 50 msec.

In step S901, the control unit 20 reads in the accelerator pedal actuation amount S detected by the accelerator pedal stroke sensor 3. In step S902, the control unit 20 reads in the host vehicle speed V1, the preceding vehicle V2, and the headway distance D based on the detection signals from the headway distance sensor 1 and the vehicle speed sensor 2. In step S903, the control unit 20 reads in the throttle valve opening degree command value ACC, which is based on the accelerator pedal actuation amount S and the host vehicle speed V1 (i.e., ACC=f(V1, S)).

In step S904, the control unit 20 reads the control threshold value RP_sysA for System A and a system OFF notification threshold value S_off. In step S905, the control unit 20 calculates the risk potential RP based on the host vehicle speed V1, the preceding vehicle speed V2, and the headway distance D using the previously mentioned Equation 3.

In step S906, the control unit 20 determines if the risk potential RP calculated in step S905 is equal to or larger than the System A control threshold value RP_sysA and the accelerator pedal actuation amount S is equal to or larger than the system OFF notification threshold value S_off. If the risk potential RP is equal to or larger than the threshold value RP_sysA (RP≧RP_sysA) and the actuation amount S is equal to or larger than the threshold value S_off (S≧S_off), then the control unit 20 determines that the driver mistakenly thinks System A is in the operation-ON state and expects System A to execute control. Therefore, the control unit 20 proceeds to step S907 to make the driver aware that System A will not operate. If the risk potential RP is smaller than the threshold value RP_sysA (RP<RP_sysA) or the actuation amount S is smaller than the threshold value S_off (S<S_off), then the control unit 20 proceeds to step S910.

The processing of the steps S907 to S910 is the same as in the steps S307 to S310 of the flowchart shown in FIG. 16 and explanations of these steps are omitted for the sake of brevity.

Method 9: Increase Accelerator Pedal Reaction Force when System A is Operating.

Figure 24:
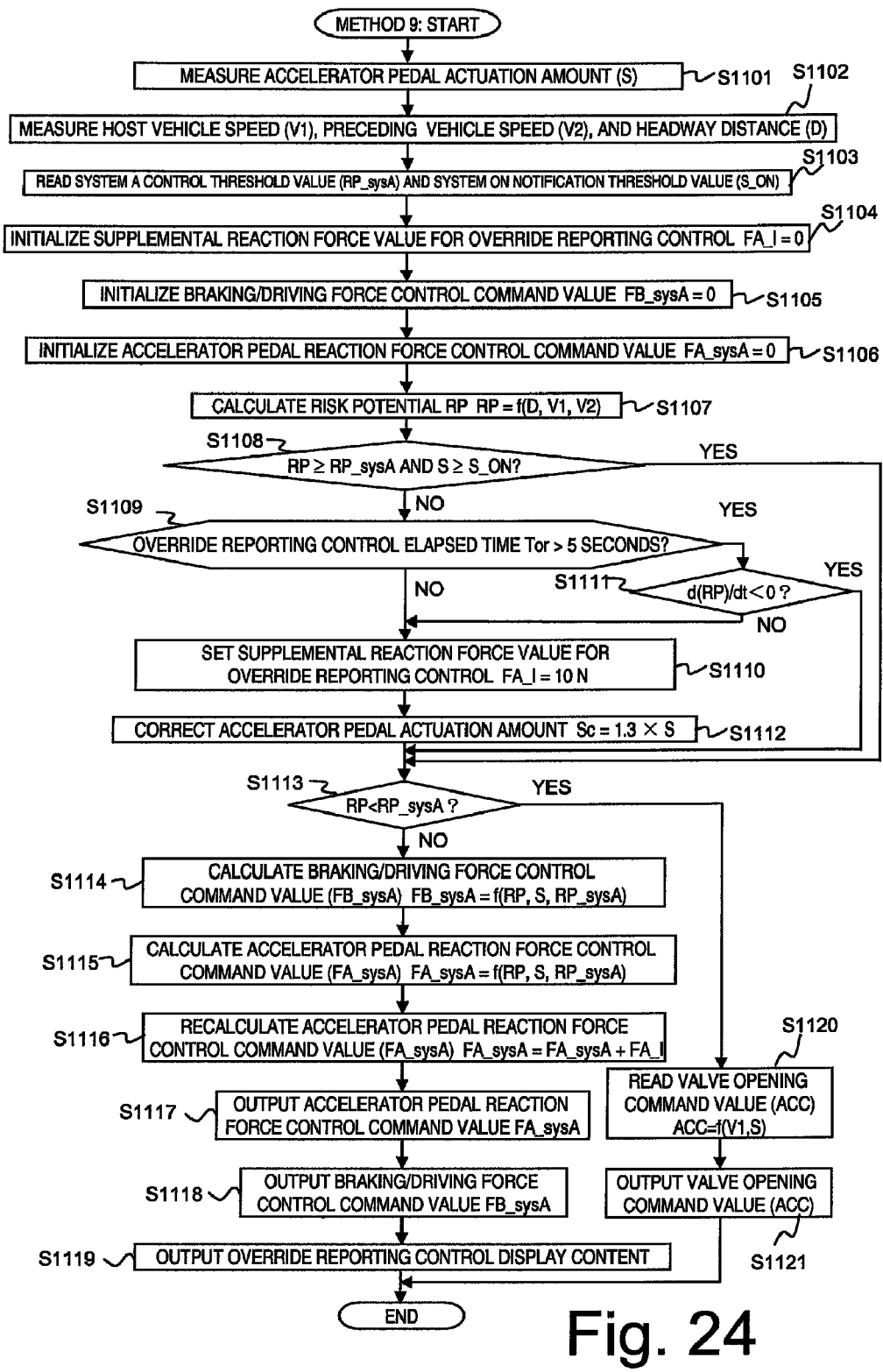
FIG. 24 is a flowchart showing the processing steps executed during override reporting control in accordance with Method 9 in accordance with the vehicle driving assist system of the present invention.

When the vehicle driving assist system is in the override state 162 of the state 136, this method serves to inform the driver that System A will operate while System B is overridden by increasing the accelerator pedal reaction force. The operations executed by the vehicle driving assist system in such a case will now be explained with reference to the flowchart of FIG. 24. FIG. 24 is a flowchart showing the processing steps of a driving assistance control program executed by the control unit 20 when the vehicle driving assist system is in the override state 162. This control loop is executed continuously once per prescribed time period, e.g., every 50 msec.

In step S1101, the control unit 20 reads in the accelerator pedal actuation amount S detected by the accelerator pedal stroke sensor 3. In step S1102, the control unit 20 reads in the host vehicle speed V1, the preceding vehicle V2, and the headway distance D based on the detection signals from the headway distance sensor 1 and the vehicle speed sensor 2. In step S103, the control unit 20 reads the control threshold value RP_sysA for System A and a system ON notification threshold value S_on. The system ON notification threshold value S_on is a threshold value of the accelerator pedal actuation amount S for determining if the driver should be informed that System A is in the operation-ON state. The threshold value S_on is set to, for example, approximately 40% of the actuation amount S corresponding to full depression of the accelerator pedal 3a (i.e., if the full depression actuation amount S is expressed as 100%, the threshold value S_on is set to approximately 40%).

In step S1104, a supplemental reaction force value FA_I is initialized (i.e., FA_I=0) for increasing the accelerator pedal reaction force during override reporting control. In step S1105, the control unit 20 initializes the braking/driving force command value FB_sysA for System A (i.e., FB_sysA=0). In step S1106, the control unit 20 initializes the accelerator pedal reaction force control command value FA_sysA for System A (i.e., FA_sysA=0).

In step S1107, the control unit 20 calculates the risk potential RP based on the host vehicle speed V1, the preceding vehicle speed V2, and the headway distance D using the previously mentioned Equation 3. In step S1108, the control unit 20 determines if the risk potential RP calculated in step S107 is equal to or larger than the System A control threshold value RP_sysA and the accelerator pedal actuation amount S is equal to or larger than the system ON notification threshold value S_on. If the risk potential RP is equal to or larger than the threshold value RP_sysA (RP≧RP_sysA) and the actuation amount S is equal to or larger than the threshold value S_on (S≧S_on), then the control unit 20 determines that the driver is depressing the accelerator pedal 3a while mistakenly thinking System A is in the operation-OFF state when it is actually in the operation-ON state. The control unit 20 proceeds to step S1109 to inform the driver that System A is operating. If the risk potential RP is smaller than the threshold value RP_sysA (RP<RP_sysA) or the actuation amount S is smaller than the threshold value S_on (S<S_on), then the control unit 20 proceeds to step S1113.

The processing of the steps S1109 to S1121 is the same as in the steps S409 to S421 of the flowchart shown in FIG. 17 and explanations of these steps are omitted for the sake of brevity.

Method 10: Increase Accelerator Pedal Reaction Force when System A is Operating.

Figure 25:
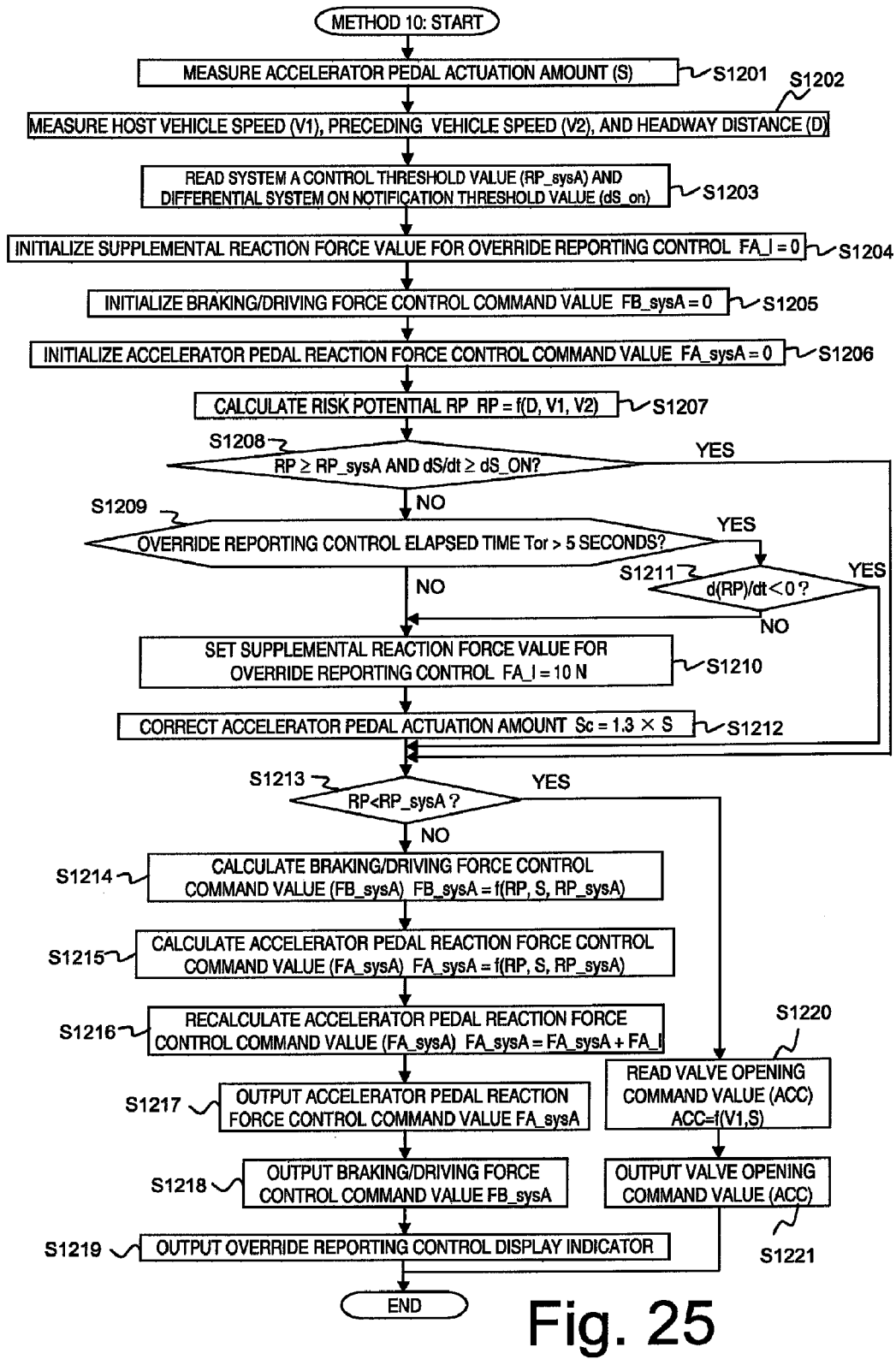
FIG. 25 is a flowchart showing the processing steps executed during override reporting control using Method 10 in accordance with the vehicle driving assist system of the present invention.

When the vehicle driving assist system is in the override state 162 of the state 136, this method serves to inform the driver that System A will operate while System B is overridden by increasing the accelerator pedal reaction force. The operations executed by the vehicle driving assist system in such a case will now be explained with reference to the flowchart of FIG. 25. FIG. 25 is a flowchart showing the processing steps of a driving assistance control program executed by the control unit 20 when the vehicle driving assist system is in the override state 162. This control loop is executed continuously once per prescribed time period, e.g., every 50 msec.

In step S1201, the control unit 20 reads in the accelerator pedal actuation amount S detected by the accelerator pedal stroke sensor 3. In step S1202, the control unit 20 reads in the host vehicle speed V1, the preceding vehicle V2, and the headway distance D based on the detection signals from the headway distance sensor 1 and the vehicle speed sensor 2. In step S1203, the control unit 20 reads the control threshold value RP_sysA for System A and a differential system ON notification threshold value dS_on. The differential system ON notification threshold value dS_on is a threshold value of the depression rate dS/dt of the accelerator pedal 3a for determining if the driver should be informed that System A is in the operation-ON state.

In step S1204, a supplemental reaction force value FA_I is initialized (i.e., FA_I=0) for increasing the accelerator pedal reaction force during override reporting control. In step S1205, the control unit 20 initializes the braking/driving force command value FB_sysA for System A (i.e., FB_sysA=0). In step S1206, the control unit 20 initializes the accelerator pedal reaction force control command value FA_sysA for System A (i.e., FA_sysA=0).

In step S1207, the control unit 20 calculates the risk potential RP based on the host vehicle speed V1, the preceding vehicle speed V2, and the headway distance D using the previously mentioned Equation 3. In step S1208, the control unit 20 determines if the risk potential RP calculated in step S1207 is equal to or larger than the System A control threshold value RP_sysA and the depression rate dS/dt of the accelerator pedal 3a is equal to or larger than the differential system ON notification threshold value dS_on. If the risk potential RP is equal to or larger than the threshold value RP_sysA (RP≧RP_sysA) and the depression rate dS/dt is equal to or larger than the threshold value dS_on (dS/dt≧dS_on), then the control unit 20 determines that the driver is depressing the accelerator pedal 3a while mistakenly thinking System A is in the operation-OFF state when it is actually in the operation-ON state. The control unit 20 proceeds to step S1209 to inform the driver that System A is operating. If the risk potential RP is smaller than the threshold value RP_sysA (RP<RP_sysA) or the depression rate dS/dt is smaller than the threshold value dS_on (dS/dt<dS_on), then the control unit 20 proceeds to step S1213.

The processing of the steps S1209 to S1221 is the same as in the steps S409 to S421 of the flowchart shown in FIG. 17 and explanations of these steps are omitted for the sake of brevity.

Method 11: Decrease Throttle Valve Opening when System A is Operating.

Figure 26:
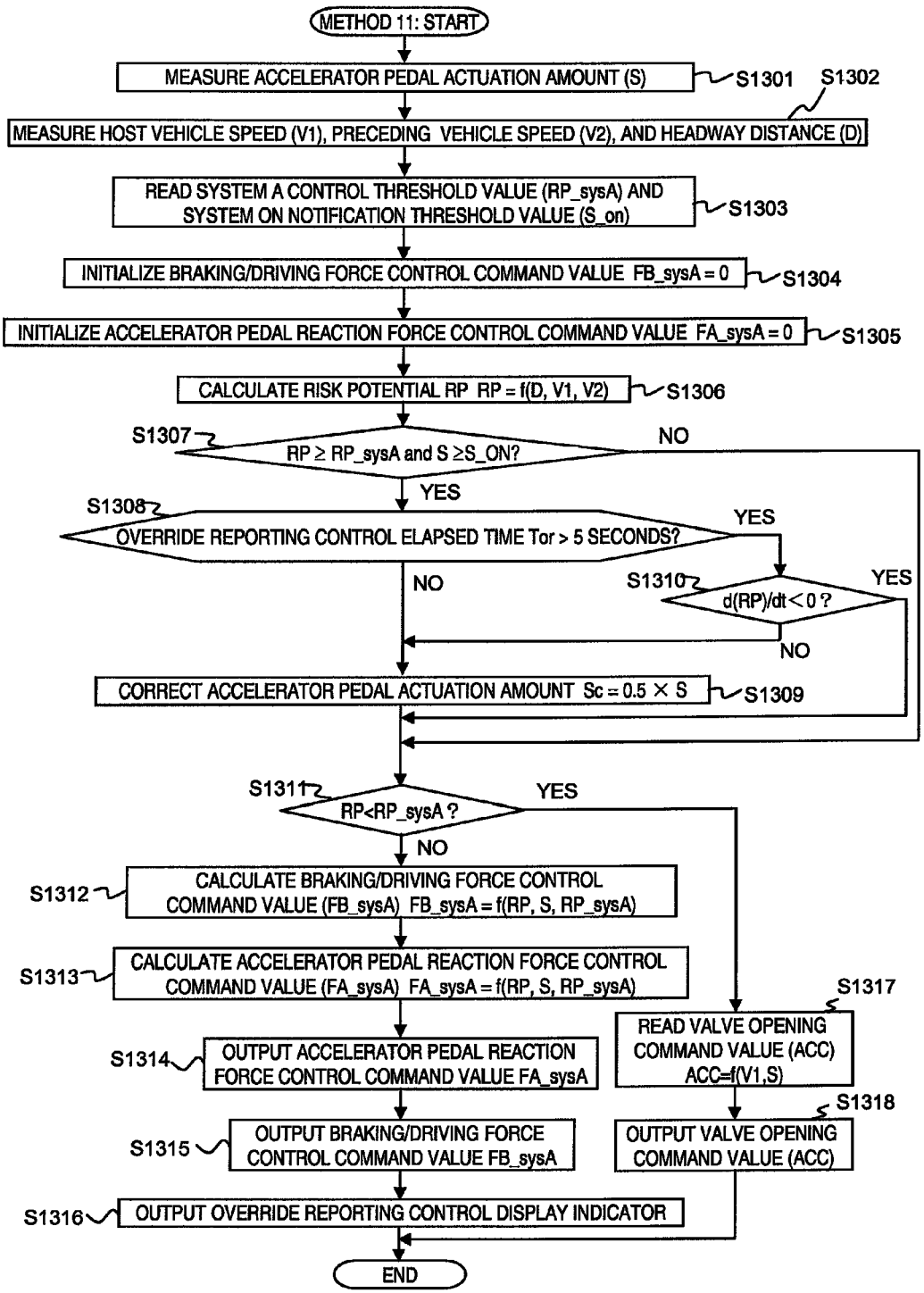
FIG. 26 is a flowchart showing the processing steps executed during override reporting control using Method 11 in accordance with the vehicle driving assist system of the present invention.

When the vehicle driving assist system is in the override state 162 of the state 136, this method serves to inform the driver that System A will operate while System B is overridden by reducing the throttle valve opening with respect to the accelerator pedal actuation amount S. The operations executed by the vehicle driving assist system in such a case will now be explained with reference to the flowchart of FIG. 26. FIG. 26 is a flowchart showing the processing steps of a driving assistance control program executed by the control unit 20 when the vehicle driving assist system is in the override state 162. This control loop is executed continuously once per prescribed time period, e.g., every 50 msec.

In step S1301, the control unit 20 reads in the accelerator pedal actuation amount S detected by the accelerator pedal stroke sensor 3. In step S1302, the control unit 20 reads in the host vehicle speed V1, the preceding vehicle V2, and the headway distance D based on the detection signals from the headway distance sensor 1 and the vehicle speed sensor 2. In step S1303, the control unit 20 reads the control threshold value RP_sysA for System A and a system ON notification threshold value S_on. In step S1304, the control unit 20 initializes the braking/driving force command value FB_sysA for System A (FB_sysA=0). In step S1305, the control unit 20 initializes the accelerator pedal reaction force control command value FA_sysA for System A (FA_sysA=0).

In step S1306, the control unit 20 calculates the risk potential RP based on the host vehicle speed V1, the preceding vehicle speed V2, and the headway distance D using the previously mentioned Equation 3. In step S1307, the control unit 20 determines if the risk potential RP calculated in step S1306 is equal to or larger than the System A control threshold value RP_sysA and the accelerator pedal actuation amount S is equal to or larger than the system ON notification threshold value S_on. If the risk potential RP is equal to or larger than the threshold value RP_sysA (RP≧RP_sysA) and the actuation amount S is equal to or larger than the threshold value S_on (S≧S_on), then the control unit 20 determines that the driver is depressing the accelerator pedal 3a while mistakenly thinking System A is in the operation-OFF state when it is actually in the operation-ON state. The control unit 20 proceeds to step S1308 to inform the driver that System A is operating. If the risk potential RP is smaller than the threshold value RP_sysA (RP<RP_sysA) or the actuation amount S is smaller than the threshold value S_on (S<S_on), then the control unit 20 proceeds to step S1311.

The processing of the steps S1308 to S1318 is the same as in the steps S608 to S618 of the flowchart shown in FIG. 20 and explanations of these steps are omitted for the sake of brevity.

Method 12: Reduce Accelerator Pedal Reaction Force and Issue Report Using Display and Sound Indicator when System A is not Operating.

Figure 27:
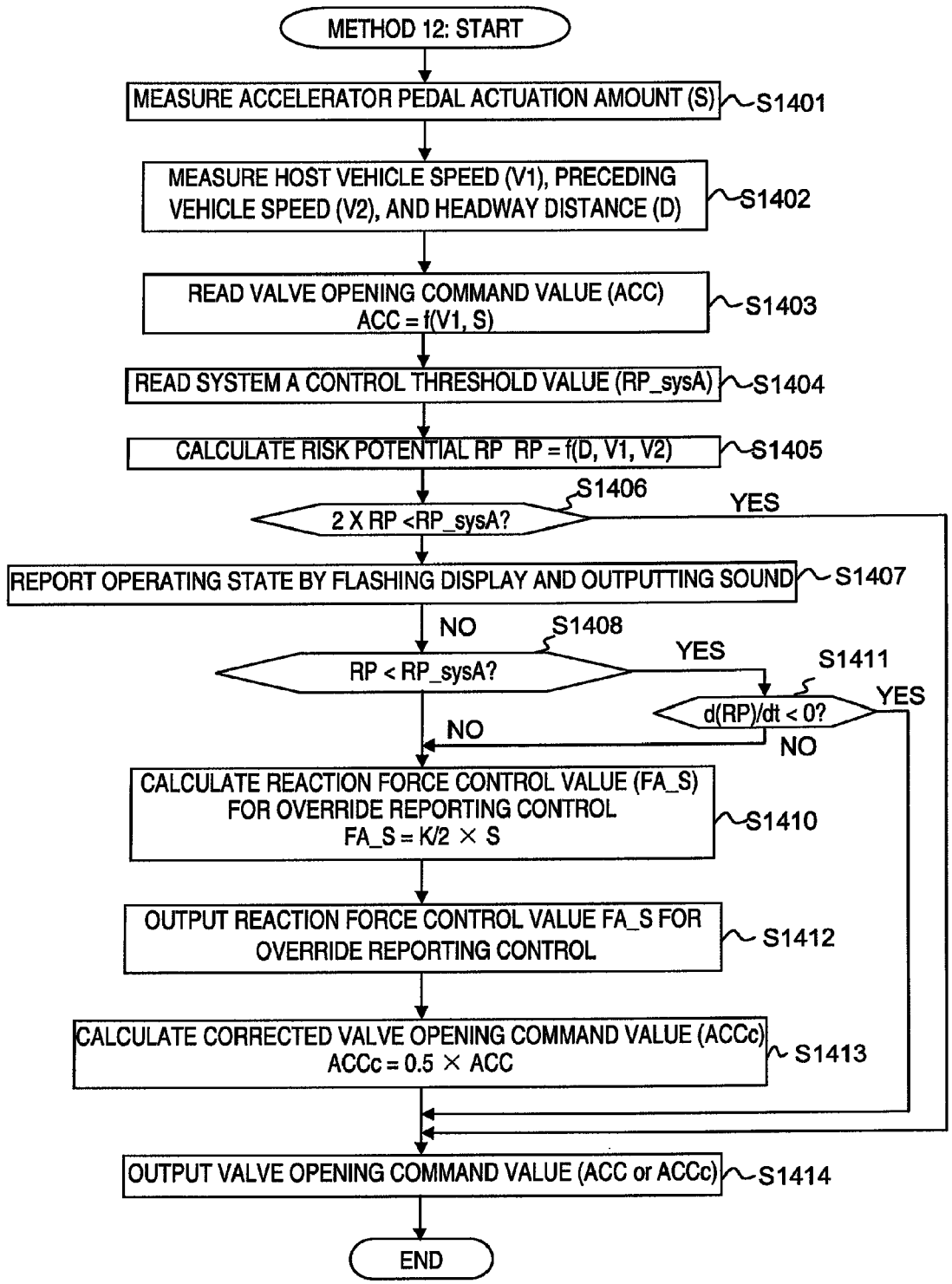
FIG. 27 is a flowchart showing the processing steps executed during override reporting control using Method 12 in accordance with the vehicle driving assist system of the present invention.

When the vehicle driving assist system is in the override state 133 of the state 111, this method serves to inform the driver that System A will not operate while System B is overridden by reducing the accelerator pedal reaction force and delivering display and sound output. The operations executed by the vehicle driving assist system in such a case will now be explained with reference to the flowchart of FIG. 27. FIG. 27 is a flowchart showing the processing steps of a driving assistance control program executed by the control unit 20 when the vehicle driving assist system is in the override state 133. This control loop is executed continuously once per prescribed time period, e.g., every 50 msec.

In step S1401, the control unit 20 reads in the accelerator pedal actuation amount S detected by the accelerator pedal stroke sensor 3. In step S11402, the control unit 20 reads in the host vehicle speed V1, the preceding vehicle V2, and the headway distance D based on the detection signals from the headway distance sensor 1 and the vehicle speed sensor 2. In step S1403, the control unit 20 reads in the throttle valve opening degree command value ACC, which is based on the accelerator pedal actuation amount S and the host vehicle speed V1 (i.e., ACC=f(V1, S)).

In step S1404, the control unit 20 reads a control threshold value RP_sysA for System A. In step S1405, the control unit 20 calculates the risk potential RP based on the host vehicle speed V1, the preceding vehicle speed V2, and the headway distance D using the previously mentioned Equation 3. In step S1406, the control unit 20 determines if the value obtained by multiplying the risk potential RP calculated in step S1405 by 2 (i.e., 2×RP) is smaller than the system A control threshold value RP_sysA. If the value 2×RP is equal to or larger than the threshold value RP_sysA (2×RP≧RP_sysA), the control unit proceeds to step S1407 to inform the driver that System A is in the operation-OFF state. If the risk potential RP is smaller than the threshold value RP_sysA (RP<RP_sysA), the control unit 20 proceeds to step S1414.

In step S1407, the control unit 20 informs the driver that System A will not operate using display and sound indicator. For example, as shown in diagram (c) of FIG. 9, the preceding vehicle mark 50, the headway distance setting mark 52, the vehicle mark 53, and the set vehicle speed (region 56) are displayed on the display monitor of the display device 34 to inform the driver that System B is in the operation-ON state. Additionally, "System B ON" is displayed flashing in the region 51. Meanwhile, the sound emitting device 35 delivers voice message stating that System A is in the operation-OFF state and the vehicle driving assist system is currently overridden.

In step S1408, the control unit 20 determines if the risk potential RP is smaller than the system A control threshold value RP_sysA. If the risk potential RP is equal to or larger than the threshold value RP_sysA (RP≧RP_sysA), then the control unit 20 determines that the driver mistakenly thinks System A is in the operation-ON state even though it is actually in the operation-OFF state. The control unit 20 proceeds to step S1409 to inform the driver that System A will not operate. If the risk potential RP is smaller than the threshold value RP_sysA (RP<RP_sysA), then the control unit 20 proceeds to step S1414.

The processing of the steps S1409 to S1414 is the same as in the steps S207 to S212 of the flowchart shown in FIG. 15 and explanations of these steps are omitted for the sake of brevity.

Method 13: Increase Accelerator Pedal Reaction Force and Issue Report Using Display Indicator, Sound Indicator, and Pedal Vibration when System A is Operating.

Figure 28:
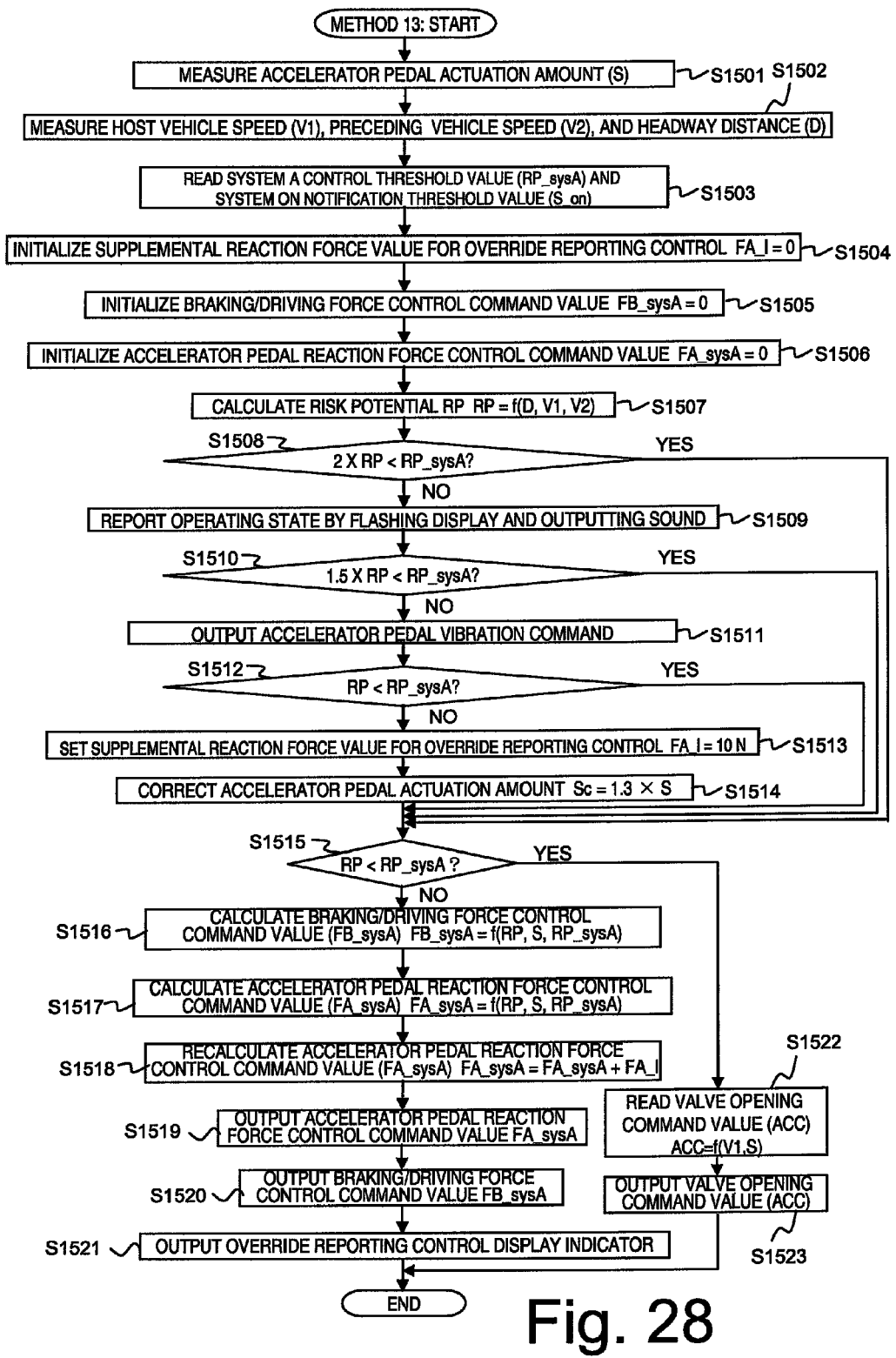
FIG. 28 is a flowchart showing the processing steps executed during override reporting control using Method 13 in accordance with the vehicle driving assist system of the present invention.

When the vehicle driving assist system is in the override state 162 of the state 136, this method serves to inform the driver that System A will operate while System B is overridden by reducing the accelerator pedal reaction force, delivering display and sound output, and vibrating the accelerator pedal 3a. The operations executed by the vehicle driving assist system in such a case will now be explained with reference to the flowchart of FIG. 28. FIG. 28 is a flowchart showing the processing steps of a driving assistance control program executed by the control unit 20 when the vehicle driving assist system is in the override state 162. This control loop is executed continuously once per prescribed time period, e.g., every 50 msec.

In step S1501, the control unit 20 reads in the accelerator pedal actuation amount S detected by the accelerator pedal stroke sensor 3. In step S1502, the control unit 20 reads in the host vehicle speed V1, the preceding vehicle V2, and the headway distance D based on the detection signals from the headway distance sensor 1 and the vehicle speed sensor 2. In step S1503, the control unit 20 reads the control threshold value RP_sysA for System A and a system ON notification threshold value S_on.

In step S1504, a supplemental reaction force value FA_I is initialized (i.e., FA_I=0) for increasing the accelerator pedal reaction force during override reporting control. In step S1505, the control unit 20 initializes the braking/driving force command value FB_sysA for System A (FB_sysA=0). In step S1506, the control unit 20 initializes the accelerator pedal reaction force control command value FA_sysA for System A (FA_sysA=0).

In step S1507, the control unit 20 calculates the risk potential RP based on the host vehicle speed V1, the preceding vehicle speed V2, and the headway distance D using the previously mentioned Equation 3. In step S1508, the control unit 20 determines if the value obtained by multiplying the risk potential RP calculated in step S1507 by 2 (i.e., 2×RP) is smaller than the system A control threshold value RP_sysA. If the value 2×RP is equal to or larger than the threshold value RP_sysA (2×RP≧RP_sysA), then the control unit 20 proceeds to step S1509 to inform the driver that System A will operate. If the value 2×Rp is smaller than the threshold value RP_sysA (2×Rp<RP_sysA), then the control unit 20 proceeds to step S 1515.

In step S1509, the control unit 20 informs the driver that System A will operate using display and sound indicator. For example, as shown in FIG. 9 (d), the preceding vehicle mark 50, the headway distance setting mark 52, the vehicle mark 53, and the set vehicle speed (region 56) are displayed on the display monitor of the display device 34 to inform the driver that Systems A and B are in the operation-ON state. Additionally, "System B ON" is displayed flashing in the region 51 and "System A ON" is displayed flashing in the region 55. Meanwhile, the sound emitting device 35 delivers voice message stating that System A is in the operation-ON state and the vehicle driving assist system is currently overridden.

In step S1510, the control unit 20 determines if the value obtained by multiplying the risk potential RP by 1.5 (i.e., 1.5×RP) is smaller than the system A control threshold value RP_sysA. If the value 1.5×RP is equal to or larger than the threshold value RP_sysA (1.5×RP≧RP_sysA), then the control unit proceeds to step S1511 to inform the driver that System A will operate. If the value 1.5×Rp is smaller than the threshold value RP_sysA (1.5×Rp<RP_sysA), then the control unit 20 proceeds to step S1515. In step S1511, the control unit 20 sends a signal to the vibrator 36 or the accelerator pedal reaction force controller 33 in order to generate a vibration in the accelerator pedal 3a.

In step S1512, the control unit 20 determines if the risk potential RP is smaller than the system A control threshold value RP_sysA. If the risk potential RP is equal to or larger than the threshold value RP_sysA (RP≧RP_sysA), then the control unit 20 determines that the driver mistakenly thinks System A is in the operation-OFF state even though it is actually in the operation-ON state. The control unit 20 proceeds to step S1513 to inform the driver that System A will operate. If the risk potential RP is smaller than the threshold value RP_sysA (RP<RP_sysA), then the control unit 20 proceeds to step S1515.

The processing of the steps S1313 to S1323 is the same as in the steps S410 to S421 of the flowchart shown in FIG. 17 and explanations of these steps are omitted for the sake of brevity.

The embodiment described heretofore can thus provide the following operational effects.

(1) The vehicle driving assist system is configured to detect an obstacle existing in front of the vehicle in which the system is installed and calculate a risk potential RP of the vehicle with respect to the obstacle based on the obstacle detection results. Additionally, the vehicle driving assist system is configured to control the actuation reaction force exerted by a driver-operated driving operation device and the braking/driving force exerted against the vehicle based on the risk potential RP (the RP conveyance control by System A) and control the braking/driving force exerted against the vehicle in such a manner as to maintain a set vehicle speed or a set following distance with respect to an obstacle (preceding vehicle following control by System B). The control unit 20 informs the driver of the operating state of System A based on the operating state of System B, the risk potential RP, and the operating state of the accelerator pedal 3a. As a result, the driver can be informed in a reliable manner whether System A is in the operation-ON state or the operation-OFF state and the driver can be urged toward a correct understanding of the operating state of the system in situations where the driver has misunderstood the operating state.

(2) Since the operating state (operation-ON or operation-OFF) of System A is displayed on the display device 35, the driver can easily be made aware of (informed of) the operating state of System A.

(3) The operating state of System A is displayed in a flashing manner in depending on the risk potential RP when control by System B is overridden due to depression of the accelerator pedal 3a. As a result, the driver can be informed of the operating state of System A in a reliable manner in situations where the risk potential RP is becoming large.

(4) The vehicle driving assist system is further equipped with a sound emitting device 35 configured to report the operating state (ON or OFF) of System a with sound (e.g., voice) indicator. By reporting with sound, the driver can grasp the operating state of System A without viewing a display and, thus, the burden born by the driver can be lightened.

(5) The vehicle driving assist system is further provided with a sound operating switch 15 configured to select whether or not the sound emitting device 35 will execute reporting using sound. By operating the sound operating switch 15, the driver can select whether or not to use sound reporting.

(6) System A is contrived to control the actuation reaction force exerted by the accelerator pedal 3a as an actuation reaction force exerted by a driver-operated driving operation device. When the control executed by System B is overridden due to depression of the accelerator pedal 3a, the actuation reaction force characteristic of the accelerator pedal 3a is changed depending on whether System A is in the operation-ON or the operation-OFF state. In the embodiment, the actuation reaction force characteristic of the accelerator pedal 3a is the characteristic defining the reaction force exerted by the accelerator pedal 3a with respect to the accelerator pedal actuation amount S. When System A is not executing accelerator pedal reaction force control, the actuation reaction force increases substantially proportionally to the accelerator pedal actuation amount S due to the spring force of a torsion spring or the like. As a result, the driver can be made aware of whether the System A is in the operation-ON state or the operation-OFF state through changes in the actuation reaction force exerted by the accelerator pedal 3a. Thus, the driver can be informed regarding the operating state of System A while continuing to look forward and operate the accelerator pedal 3a.

(7) When System A is in the operation-OFF state and the control executed by System B is overridden, the actuation reaction force characteristic is changed such that the accelerator pedal 3a is easier to depress than when actuation reaction force control is not executed by System A (Methods 1, 6, and 7). Since the reaction force characteristic is obviously different from the reaction force characteristic exhibited when actuation reaction force control is not executed, the driver can be reliably informed that System A is in the operation-OFF state.

(8) The change in the actuation reaction force characteristic just mentioned is executed temporarily based on the risk potential RP. For example (as in the case of Method 1), the actuation reaction force characteristic is changed such that accelerator pedal 3a becomes easier to depress for up to 5 seconds after the value obtained by multiplying the risk potential RP by 1.5 (1.5×RP) becomes equal to or larger than the System A control threshold value RP_sysA, or beyond 5 seconds if the risk potential does not decrease. Since the actuation reaction force characteristic is not changed when the risk potential RP is small, the override reporting control does not hinder the driver's ability to operate the accelerator pedal. Since the accelerator pedal reaction force is reduced when the risk potential RP becomes large, the driver can be informed that System A will not operate when the driver is incorrectly expecting System A to execute control. Since the change in the actuation reaction force characteristic is temporary, disturbances of the driver's operation of the accelerator pedal can be reduced.

(9) When the actuation reaction force characteristic is changed such that the accelerator pedal 3a becomes easier to depress, the throttle valve opening is adjusted in the closing direction (to a smaller opening). As a result, abrupt acceleration of the vehicle can be prevented in the event that the driver depresses the accelerator pedal 3a deeply due to the reduced accelerator pedal reaction force.

(10) When System A is in the operation-ON state and the control executed by System B is overridden, the actuation reaction force characteristic is changed such that the accelerator pedal 3a is more difficult to depress when the actuation reaction force exerted by the accelerator pedal 3a is controlled by System A (Methods 3, 9, and 10). Since the driver can feel the additional increase in the accelerator pedal reaction force, the driver can be informed (made aware) that System A is in the operation-ON state.

(11) The change in the actuation reaction force characteristic just mentioned is executed temporarily based on the risk potential RP. For example (as in the case of Method 3), the actuation reaction force characteristic is changed such that accelerator pedal 3a becomes more difficult to depress for up to 5 seconds after the value obtained by multiplying the risk potential RP by 1.5 (1.5×RP) becomes equal to or larger than the System A control threshold value RP_sysA, or beyond 5 seconds if the risk potential does not decrease. Since the actuation reaction force characteristic is not changed when the risk potential RP is small, the override reporting control does not hinder the driver's ability to operate the accelerator pedal. Since the accelerator pedal reaction force is increased when the risk potential RP becomes large, the driver can be informed that System A is in the operation-ON state when the driver is incorrectly thinking that System A will not execute control. Since the change in the actuation reaction force characteristic is temporary, disturbances of the driver's operation of the accelerator pedal can be reduced.

(12) When the actuation reaction force characteristic is changed such that the accelerator pedal 3a becomes more difficult to depress, the throttle valve opening is adjusted in the opening direction (to a larger opening). As a result, an appropriate acceleration can be achieved even if the accelerator 44 becomes difficult to depress due to the increased accelerator pedal reaction force.

(13) When System A is in the operation-ON state and the control executed by System B is overridden due to depression of the accelerator pedal 3a, a vibration is generated in the accelerator pedal (44) (Method 4). As a result, the driver can be informed in a reliable manner that System A is in the operation-ON state.

(14) When System B is overridden due to depression of the accelerator pedal 3a, the control unit 20 changes the throttle valve opening characteristic with respect to the accelerator pedal 3a. The throttle valve opening characteristic is changed in relation to a normal throttle valve opening characteristic that defines the manner in which the throttle valve opening varies with respect to the accelerator pedal depression amount S under normal circumstances in which braking/driving force control is not executed by Systems A and B. Both the normal and the changed throttle valve opening characteristic are set such that the throttle valve opening degree increases as the actuation amount of the accelerator pedal 3a increases. As a result, the degree of acceleration exhibited by the vehicle at a given depression amount S of the accelerator pedal 3a is different depending on whether the normal or changed throttle valve opening characteristic is in effect and the driver can grasp whether System A is in the operation-ON or operation-OFF state based on the perceived acceleration while continuing to look forward.

(15) When system A is in the operation OFF state and the control executed by System B is overridden, the throttle valve opening degree is corrected farther in the opening direction (to a larger opening) than when braking/driving force control is not executed by Systems A and B (Methods 2 and 8). When System A is in the operation-ON state, the braking-driving force control sometimes causes the throttle valve opening degree to become smaller. By revising the throttle valve opening degree in the opening direction, the driver can be made aware that System A is in the operation-OFF state.

(16) When system A is in the operation-ON state and the control executed by System B is overridden, the throttle valve opening degree is corrected farther in the closing direction (to a smaller opening) than dictated by the braking/driving force control executed by System A (Methods 5 and 11). When System A is in the operation-ON state, the braking-driving force control sometimes causes the throttle valve opening degree to become smaller. By revising the throttle valve opening degree farther in the closing direction, the driver can be reminded that System A is in the operation-ON state.

(17) The corrections of the throttle valve opening characteristic just described are executed temporarily based on the risk potential RP. For example (as in the case of Method 2), the characteristic is corrected such that the accelerator pedal actuation amount becomes larger and the throttle valve opening degree becomes larger for 5 seconds or less after the value obtained by multiplying the risk potential RP by 1.5 (1.5×RP) becomes equal to or larger than the System A control threshold value RP_sysA, or beyond 5 seconds if the risk potential does not decrease. Or, for example (as in the case of Method 5), the characteristic is corrected such that the accelerator pedal actuation amount becomes smaller and the throttle valve opening degree becomes smaller for 5 seconds or less after the value obtained by multiplying the risk potential RP by 1.5 (1.5×RP) becomes equal to or larger than the System A control threshold value RP_sysA, or beyond 5 seconds if the risk potential does not decrease. Since the change in the throttle valve opening characteristic is temporary, disturbances of the driver's operation of the accelerator pedal can be reduced.

(18) When System A is in the operation-OFF state and the control executed by System B is overridden, depending on the risk potential RP, the display is flashed and then (afterwards) the actuation reaction force characteristic is changed such that the accelerator pedal 3a is easier to depress than when actuation reaction force control is not executed by System A (Method 12). By changing the reporting format depending on the risk potential RP, the driver can be made to understand the operating state of System A without causing the driver to feel that something is odd.

(19) When System A is in the operation-ON state and the control executed by System B is overridden, depending on the risk potential RP, the display is flashed, then (afterwards) the accelerator pedal 3a is vibrated, and then (afterwards) the actuation reaction force characteristic is changed such that the accelerator pedal 3a is more difficult to depress when the actuation reaction force of the accelerator pedal 3a is controlled by System A (Method 13). By changing the reporting format depending on the risk potential RP, the driver can be made to understand the operating state of System A without causing the driver to feel that something is odd.

In the previously described embodiment, the risk potential RP is calculated based on the time to headway THW and the time to collision TTC between the vehicle and the preceding object and the parameters "a" and "b" are set to a=1 and b=1. However, the method of calculating the risk potential RP is not limited to these values, i.e., it is possible to set the parameters "a" and "b" to values other than 1. Furthermore, it is possible to use only the time to headway THW or the time to collision TTC or to calculate a value equivalent to the repelling force of an imaginary elastic body as the risk potential RP.

Figure 7:
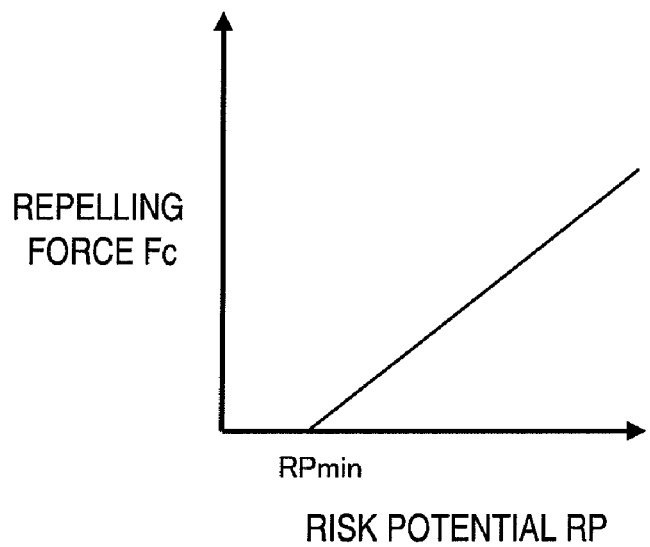
FIG. 7 is a graph plotting the repelling force versus the risk potential in accordance with the vehicle driving assist system of the present invention.

The relationship between the risk potential RP and the repelling force Fc is not limited to that shown in FIG. 7. It is possible to contrive the relationship such that the repelling force Fc increases when the risk potential RP increases. The relationship between the risk potential RP and the reaction force control command value FA_sysA is not limited to that shown in FIG. 8. It is possible to contrive the relationship such that the reaction force control command value FA_sysA increases when the risk potential RP increases.

In the previously described embodiment, braking/driving force control and accelerator pedal actuation reaction force control based on the risk potential RP are executed as the RP conveyance control. The accelerator pedal 3a is the driving operation device operated by the driver in order to drive the vehicle and the risk potential RP can be conveyed to the driver in a continuous manner through the actuation reaction force. It is also acceptable to use the brake pedal or the steering wheel as the driver-operated driving operation device and control the actuation reaction force exerted by the brake pedal or steering wheel based on the risk potential RP. It is also possible to contrive the RP conveyance control to comprise only braking/driving force control based on the risk potential RP or only actuation reaction force control based on the risk potential RP. It is also possible for the RP conveyance control to involve only driving force control and not braking force control.

In the previously described embodiment, the preceding vehicle following control includes a vehicle speed control mode, a following or headway distance control mode, and a low-speed following mode. However, it is possible to eliminate any one of these control modes so long as the braking/driving force of the vehicle is controlled such that the host vehicle speed V1 or the headway distance D from the vehicle to the preceding object is maintained constant.

FIG. 9 illustrates a series of diagrams (a) to (d) that are only examples of what is displayed during different combinations of the operation ON and OFF states of Systems A and B. The invention is not limited to the display design shown in FIG. 9.

Methods 1 to 5 are contrived such that the override reporting control is executed when the value obtained by multiplying the risk potential RP by 1.5 is equal to or larger than the system control threshold value RP_sysA and the elapsed time Tor is 5 seconds or less. However, the size of the risk potential RP and the threshold value of the elapsed time Tor are not limited to these values. The values can be set as necessary to effectively inform the driver whether System A is in the operation-ON or operation-OFF state when System B is overridden. The multiplicative coefficients used to adjust throttle valve opening degree in the closing and opening directions are not limited to 0.5 and 1.3, respectively. It is preferable to set the degree to which the throttle valve will be adjusted in the closing and opening directions (i.e., set the values of the multiplicative coefficients) as appropriate in view of the acceleration/deceleration rate of the vehicle and the perceived acceleration/deceleration felt by the driver.

In the previously described embodiment, the headway distance sensor 1 can be considered as an obstacle detecting section. The control unit 20 can function as the risk potential calculating section. The braking/driving force calculating computer 21, the accelerator pedal reaction force calculating computer 22, the engine controller 31, the brake controller 32, and the accelerator pedal reaction force controller 33 can function as the first driving assistance control system. The braking/driving force calculating computer 21, the engine controller 31, and the brake controller 32 can function as the second driving assistance control system; the accelerator pedal stroke sensor 3 can function as the accelerator pedal operating state detecting section. The braking/driving force calculating computer 21, the accelerator pedal reaction force calculating computer 22, the HMI computer 23, the engine controller 31, the brake controller 32, the accelerator pedal reaction force controller 33, the display device 34, the sound emitting device 35, and the vibrator 36 can function as the operating state reporting section. The HMI computer 23 can function as the display control component, the sound emitting device 35 can function as the sound output device, and the vibrator 36 or accelerator pedal reaction force controller 33 can function as the vibration generating component. The accelerator pedal reaction force calculating computer 22 can function as the reaction force characteristic changing component, and the braking/driving force calculating computer 21 can function as the valve opening degree adjusting section and the valve opening characteristic changing component. However, the invention is not limited to using these specific devices. For example, it is feasible to use only one controller from among the engine controller 31, the brake controller 32, and the accelerator reaction force controller 33 as the first driving assistance control system, to use only the engine controller 31 or the brake controller 32 as the second driving assistance control system, or to use some other means of causing the vehicle to decelerate.

Thus, while only selected embodiments have been chosen to illustrate the present invention, it will be apparent to those skilled in the art from this disclosure that various changes and modifications can be made herein without departing from the scope of the invention as defined in the appended claims. The functions of one element can be performed by two, and vice versa. The structures and functions of one embodiment can be adopted in another embodiment. It is not necessary for all advantages to be present in a particular embodiment at the same time. Thus, the foregoing descriptions of the embodiments according to the present invention are provided for illustration only, and not for the purpose of limiting the invention as defined by the appended claims and their equivalents.

What is claimed is:

1. A vehicle driving assist system comprising:
a preceding object detecting section configured to detect a preceding object existing in front of a host vehicle;
a risk potential calculating section configured to calculate a risk potential indicative of a degree of convergence between the host vehicle and the preceding obstacle based on a detection result of the preceding object detecting section;
a first driving assistance control system configured to control at least one of an actuation reaction force exerted by a driver-operated driving operation device and a braking/driving force exerted against the host vehicle based on the risk potential calculated by the risk potential calculating section;
a second driving assistance control system configured to control the braking/driving force of the host vehicle such that at least one of a host vehicle speed and a headway distance between the host vehicle and the preceding obstacle is maintained;
an accelerator pedal actuation state detecting section configured to detect an actuation state of an accelerator pedal; and
an operating state reporting section configured to report an operating state of the first driving assistance control system based on an operating state of the second driving assistance control system, the risk potential, and the accelerator pedal actuation state;
the first driving assistance control system being further configured to control the actuation reaction force exerted by the accelerator pedal as the actuation reaction force exerted by a driver-operated driving operation device; and
the operating state reporting section including a reaction force characteristic changing component configured to change an actuation reaction force characteristic exhibited by the accelerator pedal in accordance with the operation ON/OFF status of the first driving assistance control system when the control executed by the second driving assistance control system is overridden due to depression of the accelerator pedal.

2. The vehicle driving assist system recited in claim 1, wherein
the operating state reporting section includes a display control component that is configured to display an operation ON/OFF status of the first driving assistance control system on a display device.

3. The vehicle driving assist system recited in claim 2, wherein
the display control component is configured to flash an indicator on the display device in accordance with the risk potential when the control executed by the second driving assistance control system is overridden due to depression of the accelerator pedal.

4. The vehicle driving assist system recited in claim 1, wherein
the operating state reporting section includes a sound output device configured to emit a sound to report the operation ON/OFF status of the first driving assistance control system.

5. The vehicle driving assist system recited in claim 4, wherein
the operating state reporting section includes a sound operation switch to selectively turn the sound output device on and off.

6. The vehicle driving assist system recited in claim 1, wherein
the reaction force characteristic changing component is configured such that when the first driving assistance control system is in the operation OFF state and the control executed by the second driving assistance control system is overridden, the reaction force characteristic changing component changes the actuation reaction force characteristic such that the accelerator pedal is easier to depress than when actuation reaction force control is not executed by the first driving assistance control system.

7. The vehicle driving assist system recited in claim 6, wherein
the reaction force characteristic changing component is configured to temporarily change the actuation reaction force characteristic based on the risk potential.

8. The vehicle driving assist system recited in claim 6, further comprising
a valve opening degree adjusting section configured to adjust a throttle valve opening degree in a closing direction when the actuation reaction force characteristic is changed by the reaction force characteristic changing component.

9. The vehicle driving assist system recited in claim 1, wherein
the reaction force characteristic changing component is configured such that when the first driving assistance control system is in the operation ON state and the control executed by the second driving assistance control system is overridden, the reaction force characteristic changing component changes the actuation reaction force characteristic such that the accelerator pedal becomes more difficult to depress than when the actuation reaction force exerted by the accelerator pedal is controlled by the first driving assistance control system.

10. The vehicle driving assist system recited in claim 9, wherein
the reaction force characteristic changing component is configured to temporarily change the actuation reaction force characteristic based on the risk potential.

11. The vehicle driving assist system recited in claim 9, further comprising
a valve opening degree adjusting section configured to adjust a throttle valve opening degree in an opening direction when the actuation reaction force characteristic is changed by the reaction force characteristic changing component.

12. The vehicle driving assist system recited in claim 1, wherein
the operating state reporting section is provided with a vibration generating device configured to generate a vibration in the accelerator pedal when the first driving assistance control system is in the operation ON state and the control executed by the second driving assistance control system is overridden due to depression of the accelerator pedal.

13. The vehicle driving assist system recited in claim 1, wherein
the operating state reporting section further includes a valve opening characteristic changing component configured to change a throttle valve opening characteristic governing opening of a throttle valve in response to operation of the accelerator pedal when the control executed by the second driving assistance control system is overridden due to depression of the accelerator pedal.

14. The vehicle driving assist system recited in claim 13, wherein
the valve opening characteristic changing component is configured such that when the first driving assistance control system is in the operation OFF state and the control executed by the second driving assistance control system is overridden, the valve opening characteristic changing component corrects the throttle valve opening characteristic to a larger throttle valve opening than when neither the first driving assistance control system nor the second driving assistance control system is executing braking/driving force control.

15. The vehicle driving assist system recited in claim 13, wherein
the valve opening characteristic changing component is configured such that when the first driving assistance control system is in the operation ON state and the control executed by the second driving assistance control system is overridden, the valve opening characteristic changing component corrects the throttle valve opening characteristic to a smaller throttle valve opening than dictated by the braking/driving force control executed by the first driving assistance control system.

16. The vehicle driving assist system recited in claim 13, wherein
the valve opening characteristic changing component is configured to temporarily change the throttle valve opening characteristic based on the risk potential.

17. The vehicle driving assist system recited in claim 1, wherein
the operating state reporting section further includes a display control component configured to display an operation ON/OFF status of the first driving assistance control system on a display device,
the operating state reporting section being configured such that when the first driving assistance control system is in the operation OFF state and the control executed by the second driving assistance control system is overridden due to depression of the accelerator pedal, the display control component flashes the display of the display device in accordance with the risk potential, and then subsequently the reaction force characteristic changing component changes the actuation reaction force characteristic such that the accelerator pedal is easier to depress than when actuation reaction force control is not executed by the first driving assistance control system.

18. The vehicle driving assist system recited in claim 1, wherein
the operating state reporting section further includes a display control component configured to display an operation ON/OFF status of the first driving assistance control system on a display device and a vibration generating component configured to generate a vibration in the accelerator pedal, the operating state reporting section being configured such that when the first driving assistance control system is in the operation ON state and the control executed by the second driving assistance control system is overridden due to depression of the accelerator pedal, the display control component flashes the display of the display device in accordance with the risk potential, and then subsequently the vibration generating component generates a vibration in the accelerator pedal, and the reaction force characteristic changing component then subsequently changes the actuation reaction force characteristic such that the accelerator pedal becomes more difficult to depress than when the actuation reaction force exerted by the accelerator pedal is controlled by the first driving assistance control system.

19. A vehicle equipped with the vehicle driving assist system according to claim 1, wherein
the vehicle driving assist system is operatively installed to a vehicle body to assist a driver.

20. A vehicle driving assist system comprising:
object detecting means for detecting a preceding object existing in front of a host vehicle;
risk potential calculating means for calculating a risk potential indicative of a degree of convergence between the host vehicle and the preceding obstacle based on a detection result of the object detecting means;
first driving assistance control means for controlling at least one of an actuation reaction force exerted by a driver-operated driving operation device and a braking/driving force exerted against the host vehicle based on the risk potential calculated by the risk potential calculating means;
second driving assistance control means for controlling the braking/driving force of the host vehicle such that at least one of a host vehicle speed and a headway distance between the host vehicle and the preceding obstacle is maintained;
accelerator pedal actuation state detecting means for detecting an actuation state of an accelerator pedal; and
operating state reporting means for reporting an operating state of the first driving assistance control means based on an operating state of the second driving assistance control means, the risk potential, and the accelerator pedal actuation state;
the first driving assistance control means being further configured to control the actuation reaction force exerted by the accelerator pedal as the actuation reaction force exerted by a driver-operated driving operation device; and
the operating state reporting means further including a reaction force characteristic changing component configured to change an actuation reaction force characteristic exhibited by the accelerator pedal in accordance with the operation ON/OFF status of the first driving assistance control means when the control executed by the second driving assistance control means is overridden due to depression of the accelerator pedal.

21. The vehicle driving assist system recited in claim 20, wherein
the operating state reporting means further includes a valve opening characteristic changing component configured to change a throttle valve opening characteristic governing opening of a throttle valve in response to operation of the accelerator pedal when the control executed by the second driving assistance control means is overridden due to depression of the accelerator pedal.

22. The vehicle driving assist system recited in claim 20, wherein
the operating state reporting means further includes a display control component configured to display an operation ON/OFF status of the first driving assistance control means on a display device,
the operating state reporting means being configured such that when the first driving assistance control means is in the operation OFF state and the control executed by the second driving assistance control means is overridden due to depression of the accelerator pedal, the display control component flashes the display of the display device in accordance with the risk potential, and then subsequently the reaction force characteristic changing component changes the actuation reaction force characteristic such that the accelerator pedal is easier to depress than when actuation reaction force control is not executed by the first driving assistance control means.

23. The vehicle driving assist system recited in claim 20, wherein
the operating state reporting means further includes a display control component configured to display an operation ON/OFF status of the first driving assistance control means on a display device and a vibration generating component configured to generate a vibration in the accelerator pedal,
the operating state reporting means being configured such that when the first driving assistance control means is in the operation ON state and the control executed by the second driving assistance control means is overridden due to depression of the accelerator pedal, the display control component flashes the display of the display device in accordance with the risk potential, and then subsequently the vibration generating component generates a vibration in the accelerator pedal, and the reaction force characteristic changing component then subsequently changes the actuation reaction force characteristic such that the accelerator pedal becomes more difficult to depress than when the actuation reaction force exerted by the accelerator pedal is controlled by the first driving assistance control means.

24. A vehicle driving assistance method comprising:
operating an object sensor to detect a preceding object existing in front of a host vehicle;
operating a controller to calculate a risk potential indicative of a degree of convergence between the host vehicle and the preceding obstacle based on an obstacle detection result;
operating the controller to execute a first driving assistance control contrived to control at least one of an actuation reaction force exerted by a driver-operated driving operation device and a braking/driving force exerted against the host vehicle based on the risk potential that was calculated;
operating the controller to execute a second driving assistance control contrived to control the braking/driving force of the host vehicle such that at least one of a host vehicle speed and a headway distance between the host vehicle and the preceding obstacle is maintained;
operating an actuation sensor to detect an state of actuation of an accelerator pedal of the host vehicle; and
operating the controller to report an operating state of the first driving assistance control based on an operating state of the second driving assistance control, the risk potential, and the accelerator pedal actuation state that was detected;

the operating of the controller to execute first driving assistance control being further contrived to control the actuation reaction force exerted by the accelerator pedal as the actuation reaction force exerted by a driver-operated driving operation device; and the operating of the controller to report on the operating state further including a reaction force characteristic changing operation contrived to change an actuation reaction force characteristic exhibited by the accelerator pedal in accordance with the operation ON/OFF status of the operating of the controller to execute first driving assistance control when the control executed by the operating of the controller to execute second driving assistance control is overridden due to depression of the accelerator pedal.

25. The vehicle driving assist method recited in claim 24, wherein the operating of the controller to report on the operating state includes a valve opening characteristic changing operation contrived to change a throttle valve opening characteristic governing opening of a throttle valve in response to operation of the accelerator pedal when the control executed by the operating of the controller to execute second driving assistance control is overridden due to depression of the accelerator pedal.

26. The vehicle driving assist method recited in claim 24, wherein the operating of the controller to report on the operating state includes a display control operation contrived to display an operation ON/OFF status of the operating of the controller to execute first driving assistance control on a display device, the operating of the controller to report on the operating state being further contrived such that when the operating of the controller to execute first driving assistance control is in the operation OFF state and the control executed by the operating of the controller to execute second driving assistance control is overridden due to depression of the accelerator pedal, the display control operation flashes the display of the display device in accordance with the risk potential, and then subsequently the reaction force characteristic changing operation changes the actuation reaction force characteristic such that the accelerator pedal is easier to depress than when actuation reaction force control is not executed by the operating of the controller to execute first driving assistance control.

27. The vehicle driving assist method recited in claim 24, wherein the operating of the controller to report on the operating state further includes a display control operation contrived to display an operation ON/OFF status of the operating of the controller to execute first driving assistance control on a display device and a vibration generating operation contrived to generate a vibration in the accelerator pedal, the operating of the controller to report on the operating state being further contrived such that when the operating of the controller to execute first driving assistance control is in the operation ON state and the control executed by the operating of the controller to execute second driving assistance control is overridden due to depression of the accelerator pedal, the display control operation flashes the display of the display device in accordance with the risk potential, and then subsequently the vibration generating operation generates a vibration in the accelerator pedal, and the reaction force characteristic changing operation then subsequently changes the actuation reaction force characteristic such that the accelerator pedal becomes more difficult to depress than when the actuation reaction force exerted by the accelerator pedal is controlled by the operating of the controller to execute first driving assistance control.

* * * * *